United States Patent [19]

Yamada et al.

[11] Patent Number: 5,237,358
[45] Date of Patent: Aug. 17, 1993

[54] RADIATION IMAGE READ-OUT APPARATUS

[75] Inventors: Sadami Yamada; Nobuyoshi Nakajima; Masaaki Ohtsuka; Shuji Kuhara, all of Kanagawa, Japan

[73] Assignee: Fuji Photo Film Co., Ltd., Kanagawa, Japan

[21] Appl. No.: 779,246

[22] Filed: Oct. 18, 1991

[30] Foreign Application Priority Data

| Oct. 20, 1990 [JP] | Japan | 2-282331 |
| Oct. 20, 1990 [JP] | Japan | 2-282332 |
| Oct. 20, 1990 [JP] | Japan | 2-282334 |
| Oct. 20, 1990 [JP] | Japan | 2-282335 |
| Oct. 20, 1990 [JP] | Japan | 2-282341 |
| Oct. 20, 1990 [JP] | Japan | 2-282345 |
| Oct. 20, 1990 [JP] | Japan | 2-282347 |
| Oct. 20, 1990 [JP] | Japan | 2-282353 |

[51] Int. Cl.$^5$ .................. G03D 13/00; G03D 13/02
[52] U.S. Cl. ............................. 354/298; 354/334; 378/165; 250/580
[58] Field of Search ............ 354/297, 298, 334; 250/327.2, 484.1; 378/165, 166, 162-164

[56] References Cited

U.S. PATENT DOCUMENTS 4,906,847  3/1990  Nakajima et al. ............. 250/327.2
4,960,993 10/1996  Shigyo et al. ................. 250/327.2
5,148,464  9/1992  Metoki ............................. 378/165

FOREIGN PATENT DOCUMENTS 61-5193  2/1986  Japan.

Primary Examiner—D. Rutledge
Attorney, Agent, or Firm—Sughrue, Mion, Zinn, Macpeak & Seas

[57] ABSTRACT

A radiation image read-out apparatus comprises an automatic developing machine for carrying out a developing process on silver halide film, on which a radiation image has been recorded as a latent image, while the silver halide film is being passed through the automatic developing machine. A film digitizer is connected to the automatic developing machine such that it may directly receive the silver halide film having been fed out of the automatic developing machine. The film digitizer photoelectrically reads out the radiation image, which has been converted into a visible image during the developing process, from the silver halide film and thereby generates an image signal representing the radiation image. The radiation image read-out apparatus is free of the problems in that considerable time and labor are required to set the film manually in the film digitizer, and the film becomes stained with finger marks, dust, or the like.

46 Claims, 10 Drawing Sheets

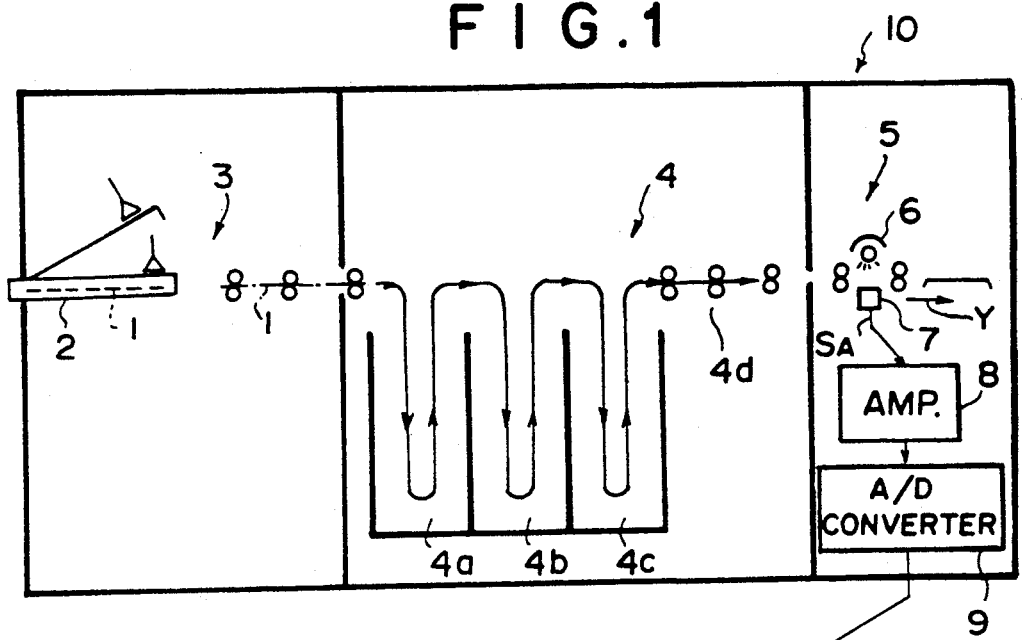
FIG.1
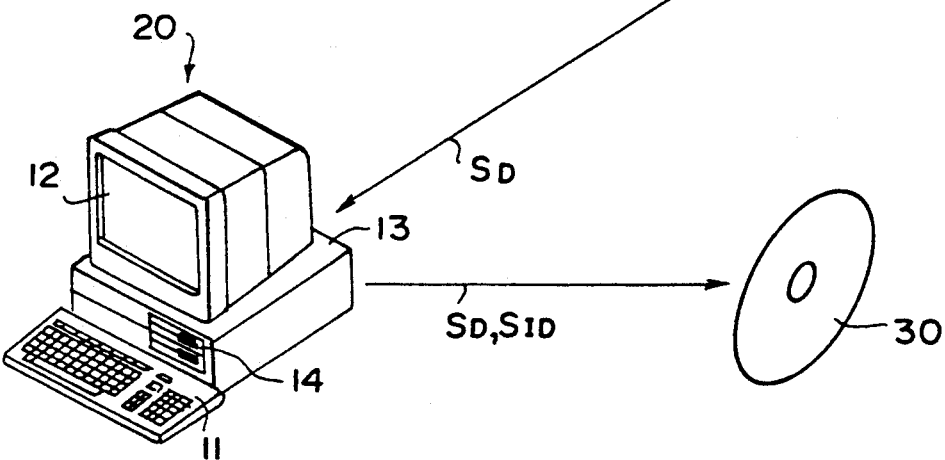
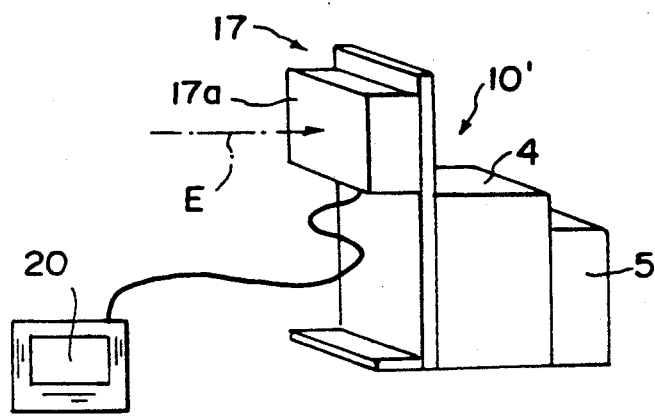
FIG.2

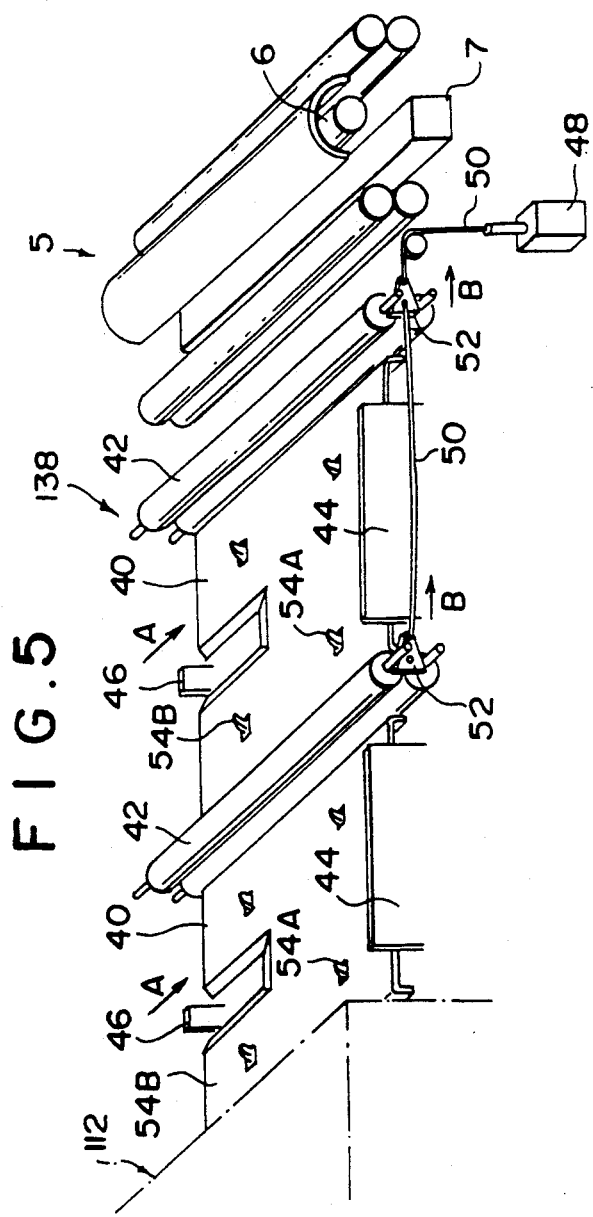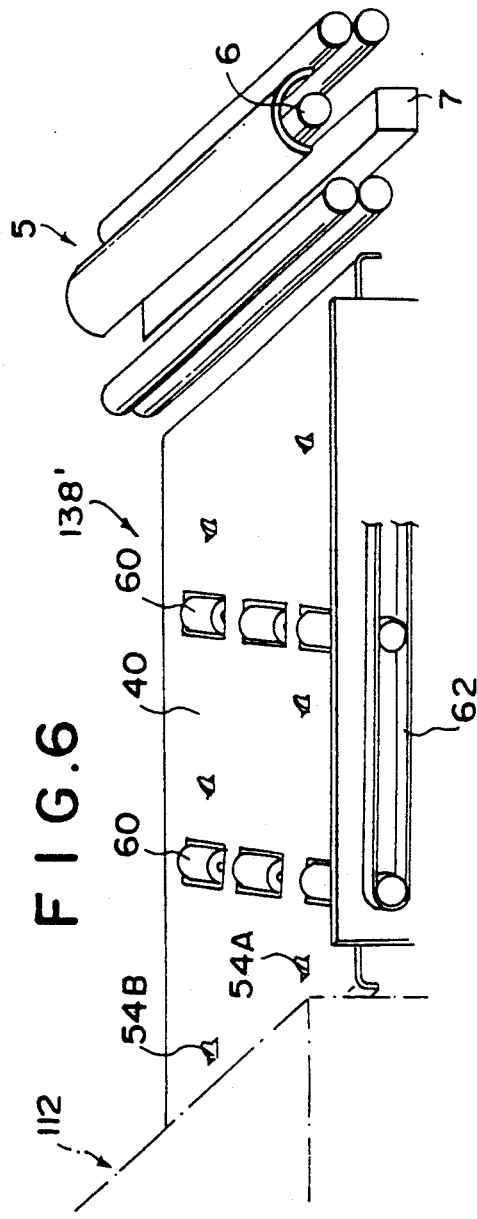

No. 12345
HANAKO FUJI, 24 YEARS
CHEST FRONT
OCT. 20, 1990

RADIATION IMAGE READ-OUT APPARATUS

BACKGROUND OF THE INVENTION

1. Field of the Invention

This invention relates to a radiation image read-out apparatus provided with a film digitizer for photoelectrically reading out a radiation image, which has been recorded on a sheet of silver halide film, such as X-ray film, and thereby generating an image signal representing the radiation image.

2. Description of the Prior Art

Techniques for reading out a recorded image in order to obtain an image signal, carrying out appropriate image processing on the image signal, and then reproducing a visible image by use of the processed image signal have heretofore been known in various fields.

For example, as disclosed in Japanese Patent Publication No. 61(1986)-5193, a sheet of X-ray film having a small gamma value chosen according to the type of image processing to be carried out is used together with an intensifying screen, and an X-ray image is recorded on the X-ray film. The X-ray film, on which the X-ray image has been recorded, is subjected to a developing process. The X-ray image is then read out from the X-ray film and converted into an electric signal (image signal) by using a film digitizer (FD). The image signal is processed and then used for reproducing the X-ray image as a visible image on a copy photograph or the like. In this manner, a visible image having good image quality with high contrast, high sharpness, high graininess, or the like, can be reproduced.

When a radiation image is recorded on a sheet of silver halide film, such as X-ray film, and read out from the silver halide film by using a film digitizer, the silver halide film is exposed to radiation, and a latent image of the radiation image is thereby recorded on the silver halide film. Thereafter, the film, on which the radiation image has been recorded, is fed into a developing machine and subjected to a developing process, which is composed of a series of developing, fixing, washing, and drying steps. The radiation image is thereby developed into a visible image. The film, on which the visible radiation image has been recorded, is set at a predetermined position in the film digitizer, and the visible radiation image is read out from the film. For this purpose, the film, which has been fed out of the developing machine, must be manually set at the predetermined position in the film digitizer. Considerable time and labor are required to carry out such manual operations. Also, when the film is processed manually, the film will be stained with finger marks, dust, or the like. Therefore, when an image signal is detected from the film and used during the reproduction of a visible radiation image, the image quality of the visible radiation image thus reproduced cannot be kept high.

SUMMARY OF THE INVENTION

The primary object of the present invention is to provide a radiation image read-out apparatus, which is free of the problems in that considerable time and labor are required to set film manually in a film digitizer, and the film becomes stained with finger marks, dust, or the like.

Another object of the present invention is to provide a radiation image read-out apparatus, which is free of the problems in that considerable time and labor are required to set film manually in a film digitizer, and the film becomes stained with finger marks, dust, or the like, and in which the film can be set accurately at a predetermined position in the film digitizer.

A further object of the present invention is to provide a radiation image read-out apparatus, which is free of the problems in that considerable time and labor are required to set film manually in a film digitizer, and the film becomes stained with finger marks, dust, or the like, and in which corrosive gases generated in an automatic developing machine are prevented from entering the film digitizer.

A still further object of the present invention is to provide a radiation image read-out apparatus, which is free of the problems in that considerable time and labor are required to set film manually in a film digitizer, and the film becomes stained with finger marks, dust, or the like, and in which an image recorded on the film can be read out accurately without being adversely affected by inaccurate conveyance of the film and discharging noise due to sparks caused to occur by electrostatic charges on the film.

Another object of the present invention is to provide a radiation image read-out apparatus, wherein radiation images recorded on sheets of film are read out by using a film digitizer, image signals representing the radiation images being thereby detected, and wherein it can be clarified accurately which image signal corresponds to which ID information giving specifics about a radiation image.

A further object of the present invention is to provide a radiation image read-out apparatus, wherein radiation images recorded on sheets of film are read out by using a film digitizer, image signals representing the radiation images being thereby detected, and wherein it can be clarified easily which image signal corresponds to which subsidiary information giving specifics about a radiation image.

A still further object of the present invention is to provide a radiation image read-out apparatus, wherein radiation images recorded on sheets of film are read out by using a film digitizer, image signals representing the radiation images being thereby detected, and wherein it can be clarified systematically and accurately which film corresponds to which ID information, and which image signal corresponds to which ID information.

The present invention provides a first radiation image read-out apparatus comprising:

i) an automatic developing machine for carrying out a developing process on silver halide film, on which a radiation image has been recorded as a latent image, while said silver halide film is being passed through said automatic developing machine, and ii) a film digitizer, which is connected to said automatic developing machine such that it may directly receive said silver halide film having been fed out of said automatic developing machine, said film digitizer photoelectrically reading out said radiation image, which has been converted into a visible image during the developing process, from said silver halide film and thereby generating an image signal representing said radiation image.

With the first radiation image read-out apparatus in accordance with the present invention, the automatic developing machine and the film digitizer are connected to each other, and the film, which has been fed out of the automatic developing machine, is directly fed into the film digitizer. Therefore, manual operations for setting the film, on which the developing process has been carried out, in the film digitizer need not be carried out. Also, there is no risk that, before the radiation image is read out from the film, the film becomes stained with finger marks, dust, or the like. Therefore, with the first radiation image read-out apparatus in accordance with the present invention, the radiation image can be read out accurately from the film, which is free of finger marks, dust, or the like.

A second radiation image read-out apparatus in accordance with the present invention is provided with a film orientation adjusting mechanism.

Specifically, the present invention also provides a second radiation image read-out apparatus comprising:
i) an automatic developing machine for carrying out a developing process on film, on which a radiation image has been recorded as a latent image, and
ii) a film digitizer, which is connected to said automatic developing machine, said film digitizer photoelectrically reading out said radiation image from said film, which has been fed out of said automatic developing machine,
wherein the improvement comprises the provision of a film orientation adjusting mechanism, which is located between said automatic developing machine and said film digitizer, said film orientation adjusting mechanism adjusting the orientation of said film, which has been fed out of said automatic developing machine, such that said film may be fed in a predetermined orientation into said film digitizer.

With the second radiation image read-out apparatus in accordance with the present invention, the radiation image recorded on the film, which has been fed out of the automatic developing machine, is read out by the film digitizer connected to the automatic developing machine. Therefore, manual operations for setting the film, on which the developing process has been carried out, in the film digitizer need not be carried out. Also, there is no risk that, before the radiation image is read out from the film, the film becomes stained with finger marks, dust, or the like. The second radiation image read-out apparatus in accordance with the present invention is also provided with the film orientation adjusting mechanism, which is located between the automatic developing machine and the film digitizer. The film orientation adjusting mechanism adjusts the orientation of the film, which has been fed out of the automatic developing machine, such that the film may be fed in a predetermined orientation into the film digitizer. Therefore, with the second radiation image read-out apparatus in accordance with the present invention, the film can be set accurately at a predetermined position in the film digitizer. Accordingly, the radiation image can be read out accurately from the film.

A third radiation image read-out apparatus in accordance with the present invention is provided with a corrosive gas inflow preventing mechanism.

Specifically, the present invention further provides a third radiation image read-out apparatus comprising:
i) an automatic developing machine for carrying out a developing process on film, on which a radiation image has been recorded as a latent image, and
ii) a film digitizer, which is connected to said automatic developing machine, said film digitizer photoelectrically reading out said radiation image from said film, which has been fed out of said automatic developing machine,
wherein the improvement comprises the provision of a corrosive gas inflow preventing mechanism for preventing corrosive gases, which are generated in said automatic developing machine, from flowing from said automatic developing machine into said film digitizer.

With the third radiation image read-out apparatus in accordance with the present invention, the radiation image recorded on the film, which has been fed out of the automatic developing machine, is read out by the film digitizer connected to the automatic developing machine. Therefore, manual operations for setting the film, on which the developing process has been carried out, in the film digitizer need not be carried out. Also, there is no risk that, before the radiation image is read out from the film, the film becomes stained with finger marks, dust, or the like. The third radiation image read-out apparatus in accordance with the present invention is also provided with the corrosive gas inflow preventing mechanism for preventing corrosive gases, such as sulfur dioxide and acetic acid gases, which are generated by chemicals used for the developing process in the automatic developing machine, from flowing from the automatic developing machine into the film digitizer. Therefore, with the third radiation image read-out apparatus in accordance with the present invention, the film digitizer can be prevented from being corroded by such corrosive gases. Accordingly, the radiation image can be read out accurately from the film.

A fourth radiation image read-out apparatus in accordance with the present invention is provided with a discharging mechanism.

Specifically, the present invention still further provides a fourth radiation image read-out apparatus comprising:
i) an automatic developing machine for carrying out a developing process on film, on which a radiation image has been recorded as a latent image, and
ii) a film digitizer, which is connected to said automatic developing machine, said film digitizer photoelectrically reading out said radiation image from said film, which has been fed out of said automatic developing machine,
wherein the improvement comprises the provision of a discharging mechanism, which is located between said automatic developing machine and said film digitizer, said discharging mechanism eliminating electrostatic charges having accumulated on said film, which has been fed out of said automatic developing machine.

With the fourth radiation image read-out apparatus in accordance with the present invention, the radiation image recorded on the film, which has been fed out of the automatic developing machine, is read out by the film digitizer connected to the automatic developing machine. Therefore, manual operations for setting the film, on which the developing process has been carried out, in the film digitizer need not be carried out. Also, there is no risk that, before the radiation image is read out from the film, the film becomes stained with finger marks, dust, or the like. The fourth radiation image read-out apparatus in accordance with the present invention is also provided with the discharging mechanism, which is located between the automatic developing machine and the film digitizer. The discharging mechanism eliminates electrostatic charges having accumulated on the film, which has been fed out of the automatic developing machine. Therefore, with the fourth radiation image read-out apparatus in accordance with the present invention, the film can be conveyed accurately and can be accurately set at a predetermined position in the film digitizer without being adversely affected by the electrostatic charging of the film. Also, discharging noise due to sparks caused to occur by electrostatic charges on the film can be prevented from occurring. Accordingly, the radiation image can be read out accurately from the film.

The present invention also provides a fifth radiation image read-out apparatus comprising:

i) an automatic developing machine for carrying out a developing process on silver halide film, on which a radiation image has been recorded as a latent image, while said silver halide film is being passed through said automatic developing machine, ii) a film digitizer, which is connected to said automatic developing machine such that it may directly receive said silver halide film having been fed out of said automatic developing machine, said film digitizer photoelectrically reading out said radiation image, which has been converted into a visible image during the developing process, from said silver halide film and thereby generating an image signal representing said radiation image, and iii) an ID terminal, from which the ID information giving specifics about said radiation image is entered.

The ID information gives specifics about the radiation image, such as the name of the object the image of which was recorded, the object number, the portion of an object the image of which was recorded (e.g., the head, the chest, or the abdomen in cases where the object is a human body), the mode in which the image was recorded (e.g., an ordinary image recording mode, an enlarged image recording mode, or a tomographic image recording mode), or the date on which the image was recorded.

With the fifth radiation image read-out apparatus in accordance with the present invention, the automatic developing machine and the film digitizer are connected to each other, and the film, which has been fed out of the automatic developing machine, is directly fed into the film digitizer. Therefore, manual operations for setting the film, on which the developing process has been carried out, in the film digitizer need not be carried out. Also, there is no risk that, before the radiation image is read out from the film, the film becomes stained with finger marks, dust, or the like. Therefore, the radiation image can be read out accurately from the film, which is free of finger marks, dust, or the like.

Also, the fifth radiation image read-out apparatus in accordance with the present invention is provided with the ID terminal, from which the ID information giving specifics about a radiation image is entered. Therefore, with the fifth radiation image read-out apparatus in accordance with the present invention, the image signal generated by the film digitizer and the ID information giving specifics about the radiation image represented by the image signal can be managed in association with each other. After a plurality of image signals obtained from the film digitizer are stored on a storage medium, the ID information can be utilized during the retrieval of an image signal representing a specific radiation image. Alternatively, when a radiation image is to be reproduced as a visible image and displayed on a display means, the corresponding ID information can be displayed together with the visible radiation image. In this manner, with the fifth radiation image read-out apparatus in accordance with the present invention, the information giving specifics about the radiation image, such as the name of the object recorded, the portion of an object the image of which was recorded, the mode in which the image was recorded, or the date on which the image was recorded, can be manifested easily.

The present invention further provides a sixth radiation image read-out apparatus comprising:

i) a take-out section, into which a cassette provided with an identification code for discriminating said cassette from other cassettes is fitted, said take-out section being provided with a means for taking silver halide film, which has been housed in said cassette fitted into said take-out section and on which a radiation image has been recorded as a latent image, out of said cassette, ii) a developing section for carrying out a developing process on said silver halide film, which has been taken out of said cassette, while said silver halide film is being passed through said developing section, iii) a read-out section for photoelectrically reading out said radiation image, which has been recorded on said silver halide film having passed through said developing section, from said silver halide film and thereby generating an image signal representing said radiation image, and iv) an ID terminal, from which the ID information giving specifics about said radiation image is entered, wherein said take-out section is provided with a first reading means for reading said identification code provided on said cassette, which has been fitted into said take-out section, and said ID terminal is provided with a second reading means for reading said identification code provided on said cassette from said cassette.

The present invention still further provides a seventh radiation image read-out apparatus comprising:

i) a take-out section, into which a cassette is fitted, said cassette housing therein silver halide film, on which a radiation image has been recorded as a latent image and which is provided with an identification code for discriminating said silver halide film from other silver halide film, said take-out section being provided with a means for taking said silver halide film, which has been housed in said cassette fitted into said take-out section, out of said cassette, ii) a developing section for carrying out a developing process on said silver halide film, which has been taken out of said cassette, while said silver halide film is being passed through said developing section, iii) a read-out section for photoelectrically reading out said radiation image, which has been recorded on said silver halide film having passed through said developing section, from said silver halide film and thereby generating an image signal representing said radiation image, and iv) an ID terminal, from which the ID information giving specifics about said radiation image is entered, wherein each said cassette is provided with a window such that said identification code provided on said silver halide film, which has been housed in said cassette, can be read through said window from the exterior of said cassette, said take-out section is provided with a first reading means for reading said identification code provided on said silver halide film, and said ID terminal is provided with a second reading means for reading said identification code, which has been provided on said silver halide film, through the window of each said cassette.

With the sixth radiation image read-out apparatus in accordance with the present invention, the cassette which houses silver halide film therein is provided with an identification code. The take-out section and the ID terminal are respectively provided with the first reading means and the second reading means for reading the identification code. Therefore, by way of example, before or after a radiation image is recorded on silver halide film, which has been housed in a cassette, the identification code provided on the cassette is read with the second reading means of the ID terminal. Also, the ID information giving specifics about the radiation image is entered from the ID terminal. When this cassette is fitted into the take-out section, the identification code provided on the cassette is read with the first reading means of the take-out section. In this manner, with the sixth radiation image read-out apparatus in accordance with the present invention, it can be clarified accurately which cassette corresponds to which ID information. Specifically, when an image signal representing the radiation image, which has been recorded on the film housed in the cassette, is obtained, it can be clarified accurately which image signal corresponds to which ID information.

With the seventh radiation image read-out apparatus in accordance with the present invention, instead of the identification code being provided on a cassette, the identification code is provided on silver halide film. The identification code is read from the silver halide film at the take-out section and the ID terminal. Therefore, with the seventh radiation image read-out apparatus in accordance with the present invention, as in the sixth radiation image read-out apparatus in accordance with the present invention, it can be clarified accurately which image signal representing a radiation image corresponds to which ID information giving specifics about a radiation image.

The present invention also provides an eighth radiation image read-out apparatus comprising:
i) a film digitizer for photoelectrically reading out a radiation image from silver halide film, on which said radiation image has been recorded, and thereby generating a first image signal representing said radiation image, and
ii) a card image reader for reading information from an ID card, on which said information has been recorded, said information being read as image information, and thereby generating a second image signal representing said information.

With the eighth radiation image read-out apparatus in accordance with the present invention, the card image reader is utilized which reads information, such as characters, from an ID card. By way of example, subsidiary information giving specifics about the radiation image may be handwritten on the ID card. The subsidiary information includes, for example, the name of the object the image of which was recorded, the object number, the portion of an object the image of which was recorded, the mode in which the image was recorded, and the date on which the image was recorded. The subsidiary information can then be read from the ID card by using the card image reader. Therefore, with the eighth radiation image read-out apparatus in accordance with the present invention, it can be clarified easily which image signal corresponds to which subsidiary information giving specifics about a radiation image. Also, the problem can be prevented from occurring in that considerable time and labor are required to enter the subsidiary information manually from, e.g., a keyboard.

The present invention further provides a ninth radiation image read-out apparatus comprising:
i) a film digitizer for photoelectrically reading out a radiation image from film, on which said radiation image has been recorded and on which a developing process has been carried out, and thereby generating an image signal representing said radiation image,
ii) an ID information input terminal, from which the ID information giving specifics about said radiation image is entered and which generates an ID signal representing said ID information, and
iii) an ID information output terminal for printing said ID information in accordance with said ID signal.

The present invention still further provides a tenth radiation image read-out apparatus comprising:
i) an automatic developing machine for carrying out a developing process on film, on which a radiation image has been recorded as a latent image, while said film is being passed through said automatic developing machine,
ii) a film digitizer for photoelectrically reading out said radiation image, which has been recorded on said film having passed through said developing machine, from said film and thereby generating an image signal representing said radiation image,
iii) an ID information input terminal, from which the ID information giving specifics about said radiation image is entered and which generates an ID signal representing said ID information, and
iv) an ID information recording means for recording a pattern of said ID information on said film in accordance with said ID signal before the developing process is carried out on said film.

The ninth radiation image read-out apparatus in accordance with the present invention is provided with the film digitizer, which reads out the radiation image from the film and thereby generates an image signal representing the radiation image, and the ID information input terminal, from which the ID information giving specifics about the radiation image is entered and which generates an ID signal representing the ID information. Therefore, with the ninth radiation image read-out apparatus in accordance with the present invention, it can be clarified which image signal corresponds to which ID signal. Also, the ninth radiation image read-out apparatus in accordance with the present invention is provided with the ID information output terminal for printing the ID information in accordance with the ID information. Therefore, by adhering the print of the ID information to the film, it can be clarified which film corresponds to which ID information. Accordingly, with the ninth radiation image read-out apparatus in accordance with the present invention, the film, the image signal representing the radiation image recorded on the film, and the ID information giving specifics about the radiation image can be managed in association with each other.

The tenth radiation image read-out apparatus in accordance with the present invention is provided with the ID information recording means for recording a pattern of the ID information, which has been entered from the ID information input terminal, on the film before the developing process is carried out on the film. Therefore, with the tenth radiation image read-out apparatus in accordance with the present invention, as in the ninth radiation image read-out apparatus in accordance with the present invention, the film, the image signal representing the radiation image recorded on the film, and the ID information giving specifics about the radiation image can be managed in association with each other. Also, no manual operations are required to adhere the print of the ID information to the film.

Accordingly, with the ninth and tenth radiation image read-out apparatuses in accordance with the present invention, after radiation images are read out from a plurality of sheets of film by using the film digitizer, the plurality of sheets of film may be stored, and then a specific sheet of film can be easily retrieved from the plurality of sheets of film.

BRIEF DESCRIPTION OF THE DRAWINGS

FIG. 1 is a schematic side view showing an embodiment of the first radiation image read-out apparatus in accordance with the present invention, which is constituted as an X-ray image read-out apparatus, FIG. 2 is a perspective view showing another embodiment of the first radiation image read-out apparatus in accordance with the present invention, which is constituted as an X-ray image read-out apparatus, FIG. 5 is a perspective view showing a film orientation adjusting mechanism employed in the embodiment of FIG. 3, FIG. 6 is a perspective view showing a film orientation adjusting mechanism employed in another embodiment of the second radiation image read-out apparatus in accordance with the present invention.

DESCRIPTION OF THE PREFERRED EMBODIMENTS

Figure 3:
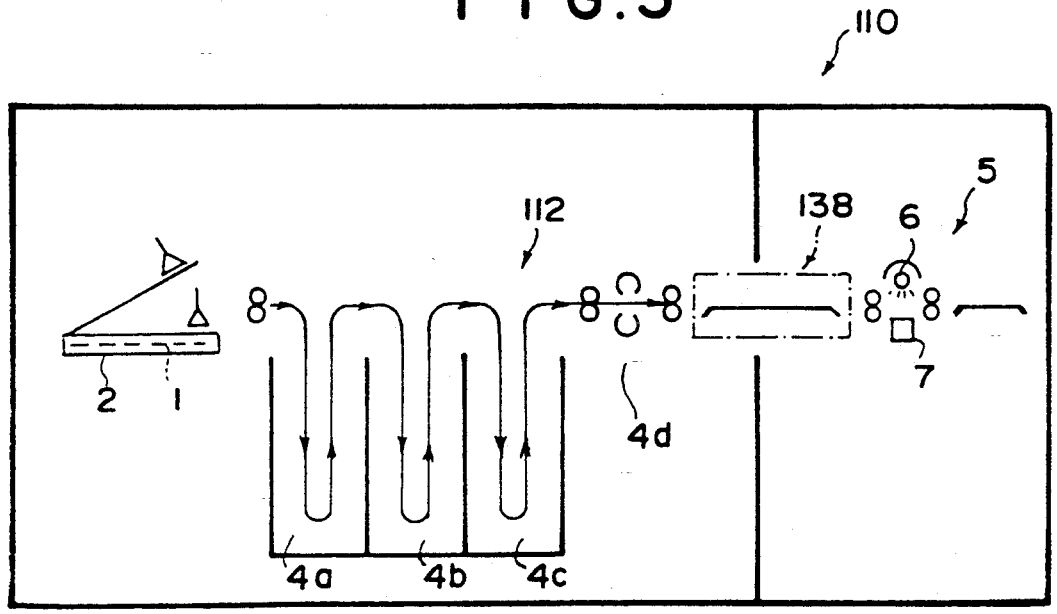
FIG. 3 is a schematic side view showing an embodiment of the second radiation image read-out apparatus in accordance with the present invention.

The present invention will hereinbelow be described in further detail with reference to the accompanying drawings.

FIG. 1 is a schematic side view showing an embodiment of the first radiation image read-out apparatus in accordance with the present invention, which is constituted as an X-ray image read out apparatus 10.

With reference to FIG. 1, a sheet of X-ray film 1 is housed in a cassette 2. An X-ray image has been recorded on the X-ray film 1, which has been housed in the cassette 2, in an X-ray image recording apparatus (not shown). The cassette 2, in which the X-ray film 1 carrying the X-ray image recorded thereon is housed, is set at an automatic cassette opener 3 in the X-ray image read-out apparatus 10. Thereafter, at the automatic cassette opener 3, the cassette 2 is opened, and the X-ray film 1 is taken out of the cassette 2. The X-ray film 1, which has been taken out of the cassette 2, is fed into an automatic developing machine 4.

Instead of the automatic cassette opener 3 being provided, a film fitting device may be employed which is disclosed in, for example, Japanese Unexamined Patent Publication No. 58(1983)-91442 or 2(1990)-212830. The disclosed film fitting device stores a plurality of sheets of X-ray film, on which no X-ray image has been recorded. With the disclosed film fitting device, after a sheet of X-ray film, on which an X-ray image has been recorded, is taken out of the cassette 2, a sheet of X-ray film, on which no X-ray image has been recorded, is automatically housed in the cassette 2.

The X-ray film 1, which has been fed into the automatic developing machine 4, is passed through a developing zone 4$a$, a fixing zone 4$b$, a washing zone 4$c$, and a drying zone 4$d$. In this manner, the X-ray film 1 is subjected to development, fixing, washing, and drying steps. Thereafter, the X-ray film 1 is fed into a film digitizer 5 and conveyed therein along a conveyance path. In the film digitizer 5, a lamp 6 is located above the conveyance path, along which the X-ray film 1 is conveyed. The lamp 6 extends along a line normal to the plane of the sheet of FIG. 1 (i.e. along a direction X) and linearly irradiates light to the X-ray film 1, which is located in the conveyance path. A line sensor 7, which may be constituted of a CCD array, or the like, is located on the side opposite to the lamp 6 with respect to the X-ray film 1 such that the line sensor 7 faces the lamp 6. The line sensor 7 extends along the line normal to the plane of the sheet of FIG. 1. When the X-ray film 1 is conveyed through the film digitizer 5 in the direction indicated by the arrow Y and reaches the position between the lamp 6 and the line sensor 7, the light produced by the lamp 6 passes through the X-ray film 1. The intensity of the light, which has passed through the X-ray film 1, is modified in accordance with the X-ray image recorded on the X-ray film 1. The light, which has passed through the X-ray film 1, is detected by the line sensor 7. In this manner, an analog image signal SA representing the image information recorded on a single line on the X-ray film 1, which line extends in the direction X normal to the plane of the sheet of FIG. 1, is obtained. By repeating the detection of the light while the X-ray film 1 is being conveyed in the direction indicated by the arrow Y, an analog image signal SA is obtained which represents the whole X-ray image recorded on the X-ray film 1. The image signal SA is then amplified by an amplifier 8 and converted by an A/D converter 9 into a digital image signal SD. The image signal SD is fed into a computer system 20.

The computer system 20 is constituted of a keyboard 11, a CRT display device 12, a main body 13 in which a CPU and an internal memory are incorporated, and a floppy disk drive unit 14 which receives and operates a floppy disk serving as an auxiliary memory. From the keyboard 11 of the computer system 20, the ID information giving specifics about the X-ray image recorded on the X-ray film 1 is entered. The specifics about the X-ray image include, for example, the name of the object the image of which was recorded, the object number, the portion of an object the image of which was recorded, the mode in which the image was recorded, or the date on which the image was recorded. In the computer system 20, an ID signal SID representing the ID information is generated. The ID information is also displayed on the CRT display device 12. The displayed ID information is used in confirming that correct ID information has been entered. The ID signal SID and the image signal SD, which has been fed from the film digitizer 5, are fed in association with each other into an optical disk storage device (not shown). The image signal SD and the corresponding ID signal SID are stored on an optical disk 30, which has been fitted into the optical disk storage device.

FIG. 2 is a perspective view showing another embodiment of the first radiation image read-out apparatus in accordance with the present invention, which is constituted as an X-ray image read-out apparatus 10'. In FIG. 2, similar elements are numbered with the same reference numerals with respect to FIG. 1.

With reference to FIG. 2, an image recording apparatus 17 (an X-ray source is not shown) is connected to the X-ray image read-out apparatus 10'. A plurality of sheets of X-ray film, on which no X-ray image has been recorded, are accommodated in the image recording apparatus 17. During operations for recording X-ray images, the sheets of X-ray film are fed one after another to the rear side of an image recording surface 17a. After a sheet of X-ray film has been set on the rear side of the image recording surface 17a, X-rays are produced by the X-ray source and irradiated to an object. The X-rays, which have passed through the object, pass through the image recording surface 17a from the direction indicated by the arrow E and impinge upon the X-ray film. As a result, an X-ray image of the object is recorded as a latent image on the X-ray film. The X-ray film, on which the X-ray image has been recorded, is fed directly from the image recording apparatus 17 into the automatic developing machine 4. In this manner, instead of the X-ray film being housed in a cassette 2 and fitted into the X-ray image read-out apparatus, the X-ray image read-out apparatus may be connected to the X-ray image recording apparatus, and the X-ray film may be automatically processed from the image recording step to the image read-out step.

In the embodiments of FIGS. 1 and 2, the line sensor 7 is employed in the film digitizer 5. Therefore, an image signal is obtained which has been sampled at predetermined, fixed sampling intervals with respect to the direction X, which direction is normal to the plane of the sheet of FIG. 1. Alternatively, in cases where sheets of X-ray film having various different sizes are used, instead of the line sensor 7 being employed, the light which has passed through the X-ray film 1 may be collected at a single location by using a light guide member, an optical fiber, or the like. The light, which has thus been collected, may be received by a photoelectric converter, such as a photomultiplier. Thereafter, the image signal may be sampled at sampling intervals, which are selected in accordance with the size of the X-ray film, with respect to the directions X and Y. In cases where the line sensor 7 is employed, a line sensor having elements arrayed at intervals corresponding to the smallest sampling intervals may be utilized. In such cases, after an image signal is obtained, interpolating operations, or the like, may be carried out on the image signal such that an image signal sampled at sampling intervals appropriate for the film size may be obtained ultimately.

Embodiments of the second radiation image read-out apparatus in accordance with the present invention will be described hereinbelow.

FIG. 3 is a schematic side view showing an embodiment of the second radiation image read-out apparatus in accordance with the present invention. In FIG. 3, similar elements are numbered with the same reference numerals with respect to FIG. 1.

With reference to FIG. 3, a radiation image read-out apparatus 110 comprises an automatic developing machine 112 and a film digitizer 5, which is connected to the automatic developing machine 112.

In the automatic developing machine 112, X-ray film 1, on which an X-ray image has been recorded as a latent image in an X-ray image recording apparatus (not shown), is taken out of the cassette 2. The X-ray film 1, which has been taken out of the cassette 2, is passed through the developing zone 4a, the fixing zone 4b, the washing zone 4c, and the drying zone 4d. In this manner, a developing process is carried out on the X-ray film 1.

The film digitizer 5 reads out the X-ray image from the X-ray film 1, which has been fed out of the automatic developing machine 112. A digital image signal representing the X-ray image is thereby obtained.

Figure 4:
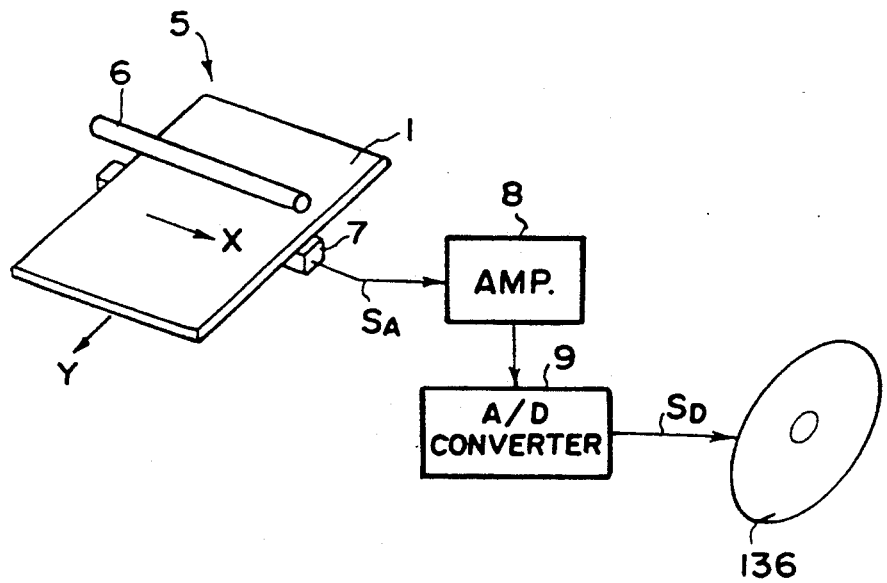
FIG. 4 is a perspective view showing a film digitizer employed in the embodiment of FIG. 3.

FIG. 4 is a perspective view showing the film digitizer 5 employed in the embodiment of FIG. 3.

With reference to FIG. 4, the X-ray film 1, which has been fed out of the automatic developing machine 112, is conveyed along a conveyance path in the direction indicated by the arrow Y through the film digitizer 5.

In the film digitizer 5, a lamp 6 is located above the conveyance path, along which the X-ray film 1 is conveyed. The lamp 6 linearly irradiates light to the X-ray film 1, which is located in the conveyance path. A line sensor 7, which may be constituted of a CCD array, or the like, is located on the side opposite to the lamp 6 with respect to the X-ray film 1 such that the line sensor 7 faces the lamp 6. When the X-ray film 1 is conveyed through the film digitizer 5 in the direction indicated by the arrow Y from a predetermined position and reaches the position between the lamp 6 and the line sensor 7, the light produced by the lamp 6 passes through the X-ray film 1. The intensity of the light, which has passed through the X-ray film 1, is modified in accordance with the X-ray image recorded on the X-ray film 1. The light, which has passed through the X-ray film 1, is detected by the line sensor 7. In this manner, an analog image signal SA representing the image information recorded on a single line on the X-ray film 1, which line extends in the direction indicated by the arrow X, is obtained. By repeating the detection of the light while the X-ray film 1 is being conveyed in the direction indicated by the arrow Y, an analog image signal SA is obtained which represents the whole X-ray image recorded on the X-ray film 1. The image signal SA is then amplified by an amplifier 8 and converted by an A/D converter 9 into a digital image signal SD. The image signal SD is stored on an optical disk 136.

In order for the image to be read out accurately by the film digitizer 5, the image read-out operation should be begun after the X-ray film 1 is set at a predetermined position in the film digitizer 5.

For this purpose, in this embodiment, as indicated by the chained line in FIG. 3, a film orientation adjusting mechanism 138 is located between the automatic developing machine 112 and the film digitizer 5. The film orientation adjusting mechanism 138 adjusts the orientation of the X-ray film 1 such that the X-ray film 1, which has been fed out of the automatic developing machine 112, may be fed in a predetermined orientation into the film digitizer 5.

FIG. 5 is a perspective view showing the film orientation adjusting mechanism 138.

With reference to FIG. 5, the film orientation adjusting mechanism 138 comprises a first set of a guide plate 40, nip rollers 42, a stop plate 44, and an adjusting lever 46. The film orientation adjusting mechanism 138 also comprises a second set of a guide plate 40, nip rollers 42, a stop plate 44, and an adjusting lever 46. The first and second sets are located in series. In the first set, the X-ray film 1 (not shown in FIG. 5), which has been fed out of the automatic developing machine 112, is fed by the nip rollers 42 along the guide plate 40 into the film digitizer 5. In each of the first and second sets, the orientation of the X-ray film 1 is adjusted on the guide plate 40. Specifically, the adjusting lever 46 is moved in the direction indicated by the arrow A, and the X-ray film 1 located on the guide plate 40 is thereby pushed against the stop plate 44. At this time, in order for the position of the X-ray film 1 to be adjusted smoothly, the nipping force of the nip rollers 42 for the X-ray film 1 is released in synchronization with the movement of the adjusting lever 46. For this purpose, a wedge-like member 52, which is connected by a wire 50 to a solenoid 48, is moved in the direction indicated by the arrow B by the operation of the solenoid 48. In this manner, the nip rollers 42 are moved away from each other.

The guide plate 40 is provided with a plurality of of film detecting levers 54A, which are located in a row, and a plurality of of film detecting levers 54B, which are located in a row. The row of the film detecting levers 54A and the row of the film detecting levers 54B are spaced a predetermined distance from each other in the width direction of the guide plate 40. When no X-ray film is present on the guide plate 40, the film detecting levers 54A and 54B project from the guide plate 40. When the X-ray film 1 is placed on the guide plate 40, the film detecting levers 54A and 54B are depressed by the X-ray film 1 such that they are flush with the surface of the guide plate 40. The presence of the X-ray film 1 on the guide plate 40 is thereby detected. Specifically, after the position of the X-ray film 1 is adjusted by the adjusting lever 46, the film detecting levers 54A, which are located on the side of the stop plate 44, detect the presence of the X-ray film 1 regardless of the size of the X-ray film 1. The film detecting levers 54B, which are located on the side of the adjusting lever 46, detect the presence of X-ray film having a large size, but do not detect the presence of X-ray film having a small size.

As described above, with the radiation image read-out apparatus 110, the X-ray image, which has been recorded on the X-ray film 1 having fed out of the automatic developing machine 112, is read out by the film digitizer 5, which is connected to the automatic developing machine 112. Therefore, manual operations for setting the X-ray film 1, on which the developing process has been carried out, in the film digitizer 5 need not be carried out. Also, there is no risk that, before the X-ray image is read out from the X-ray film 1, the film becomes stained with finger marks, dust, or the like. The radiation image read-out apparatus 110 is also provided with the film orientation adjusting mechanism 138, which is located between the automatic developing machine 112 and the film digitizer 5. The film orientation adjusting mechanism 138 adjusts the orientation of the X-ray film 1, which has been fed out of the automatic developing machine 112, such that the X-ray film 1 may be fed in a predetermined orientation into the film digitizer 5. Therefore, with the radiation image read-out apparatus 110, the X-ray film 1 can be set accurately at a predetermined position in the film digitizer 5. Accordingly, the X-ray image can be read out accurately from the X-ray film 1.

Also, in this embodiment, the film orientation adjusting mechanism 138 is constituted such that the X-ray film 1 is pushed by the adjusting lever 46 against the stop plate 44. Therefore, even if the X-ray film 1, which has been fed out of the automatic developing machine 112, is charged electrostatically or curled, its orientation can be adjusted forcibly. Additionally, in this embodiment, the film orientation adjusting mechanism 138 is provided with the film detecting levers 54A and 54B. Therefore, the size and the presence or absence of the X-ray film 1, on which the image read-out operation is to be carried out by the film digitizer 5, can be detected.

FIG. 6 is a perspective view showing a film orientation adjusting mechanism employed in another embodiment of the second radiation image read-out apparatus in accordance with the present invention.

In this embodiment, the radiation image read-out apparatus 110 is provided with a film orientation adjusting mechanism 138', which is different from the film orientation adjusting mechanism 138 shown in FIG. 5. Specifically, the film orientation adjusting mechanism 138' is provided with oblique feed rollers 60, 60, ... in lieu of the nip rollers 42, 42 and the adjusting levers 46, 46 shown in FIG. 5. The oblique feed rollers 60, 60, ... are rotated by a belt 62 so as to feed the X-ray film 1 and adjust the orientation of the X-ray film 1.

In the aforesaid embodiments of the second radiation image read-out apparatus in accordance with the present invention, the film orientation adjusting mechanism 138 or 138' is located at the junction between the automatic developing machine 112 and the film digitizer 5. Alternatively, the conveyance system of the drying zone 4d in the automatic developing machine 112 may be provided with a film orientation adjusting mechanism.

Embodiments of the third radiation image read-out apparatus in accordance with the present invention will be described hereinbelow.

Figure 7:
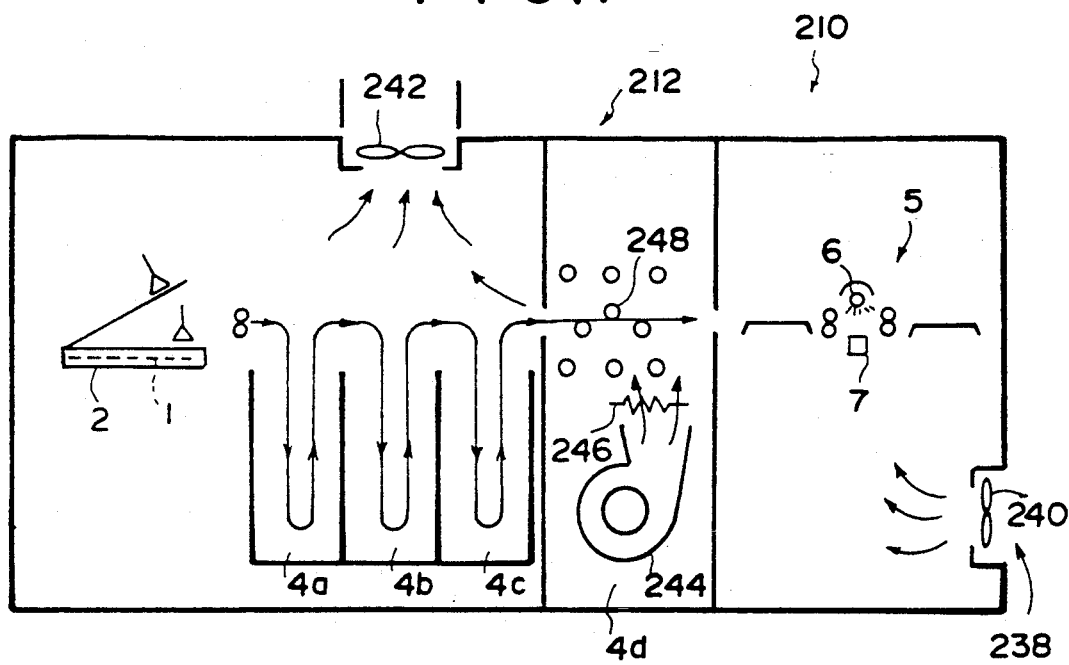
FIG. 7 is a schematic side view showing an embodiment of the third radiation image read-out apparatus in accordance with the present invention.

FIG. 7 is a schematic side view showing an embodiment of the third radiation image read-out apparatus in accordance with the present invention. In FIG. 7, similar elements are numbered with the same reference numerals with respect to FIG. 3.

With reference to FIG. 7, a radiation image read-out apparatus 210 is provided with an automatic developing machine 212 and a film digitizer 5, which is connected to the automatic developing machine 212.

In the automatic developing machine 212, corrosive gases, such as sulfur dioxide and acetic acid gases, are generated by chemicals used for the developing process. In cases where the film digitizer 5 is connected to the automatic developing machine 212, there is the risk that the corrosive gases, which have been generated in the automatic developing machine 212, flow into the film digitizer 5. If the corrosive gases flow into the film digitizer 5, the film digitizer 5 will be corroded by the corrosive gases. As a result, the X-ray image recorded on the X-ray film 1 cannot be read out accurately, and therefore an image signal accurately representing the X-ray image cannot be obtained.

In order to eliminate the aforesaid problems, this embodiment is provided with a corrosive gas inflow preventing mechanism, which prevents the corrosive gases generated in the automatic developing machine 212 from flowing from the automatic developing machine 212 into the film digitizer 5.

Specifically, in this embodiment, as shown in FIG. 7, the corrosive gas inflow preventing mechanism is constituted of a pressure adjusting mechanism 238, which adjusts the pressure in the film digitizer 5 such that it may be kept higher than the pressure in the automatic developing machine 212. The pressure adjusting mechanism 238 is provided with a pressurizing fan 240, which introduces ambient air into the film digitizer 5, and an exhaust fan 242, which discharges air from the automatic developing machine 212 to the exterior. With the pressurizing fan 240 and the exhaust fan 242, the pressure in the film digitizer 5 is kept higher than the pressure in the automatic developing machine 212. Also, in this embodiment, the drying zone 4d in the automatic partitioned from the compartment, in which the developing zone 4a, the fixing zone 4b, and the washing zone 4c are located. Ambient air is introduced by a suction fan 244 into the drying zone 4d and is heated by a nichrome wire 246. The heated air is blown to the X-ray film 1, which is being conveyed by pass rollers 248. In this manner, the X-ray film 1 is dried. By constituting the drying zone 4d in this manner, the pressure in the drying zone 4d can be kept higher than the pressure in the developing zone. Therefore, the corrosive gases, which have been generated in the developing zone 4a, can be prevented more reliably from flowing into the film digitizer 5.

As described above, with the radiation image read-out apparatus 210, the X-ray image, which has been recorded on the X-ray film 1 having fed out of the automatic developing machine 212, is read out by the film digitizer 5, which is connected to the automatic developing machine 212. Therefore, manual operations for setting the X-ray film 1, on which the developing process has been carried out, in the film digitizer 5 need not be carried out. Also, there is no risk that, before the X-ray image is read out from the X-ray film 1, the film becomes stained with finger marks, dust, or the like. The radiation image read-out apparatus 210 is also provided with the pressure adjusting mechanism 238. The pressure adjusting mechanism 238 serve as the corrosive gas inflow preventing mechanism for preventing the corrosive gases, which are generated in the drying zone 4a of the automatic developing machine 212, from flowing from the automatic developing machine 212 into the film digitizer 5. Therefore, with the radiation image read-out apparatus 210, the film digitizer 5 can be prevented from being corroded by such corrosive gases. Accordingly, the X-ray image can be read out accurately from the X-ray film 1.

Additionally, in this embodiment, the pressure in the drying zone 4d of the automatic developing machine 212 is kept higher than the pressure in the other zones of the automatic developing machine 212. Therefore, flow of the corrosive gases into the film digitizer 5 can be prevented more reliably.

Figure 8:
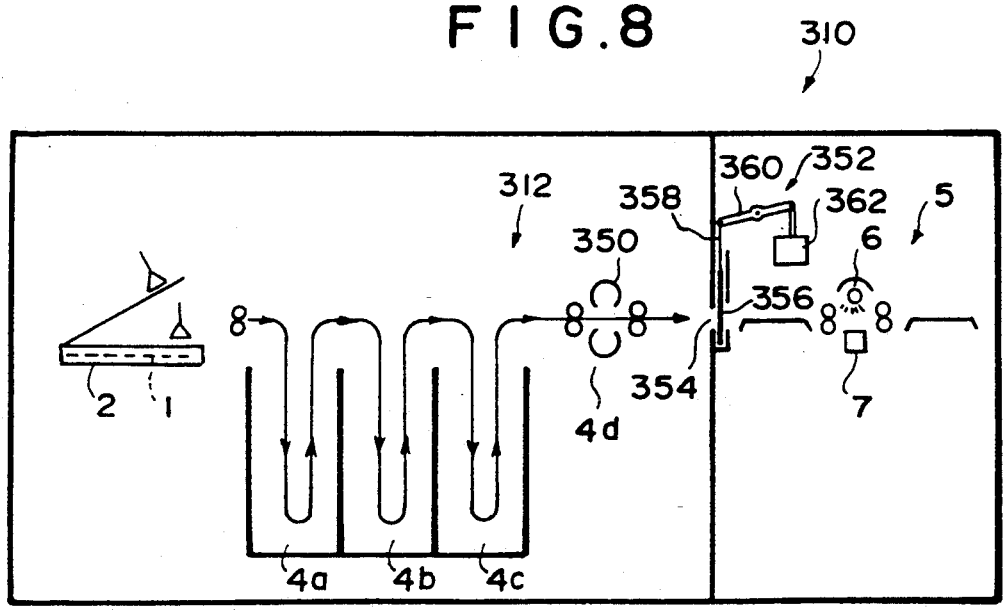
FIGS. 8, 9, and 10 are schematic side views showing different embodiments of the third radiation image read-out apparatus in accordance with the present invention.
Figure 9:
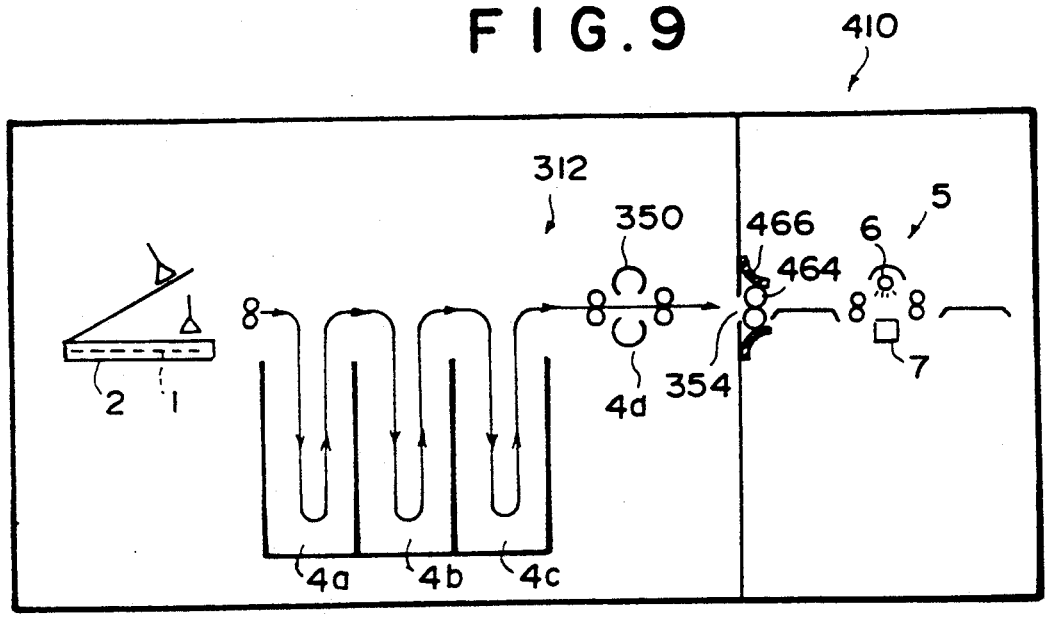
Figure 10:
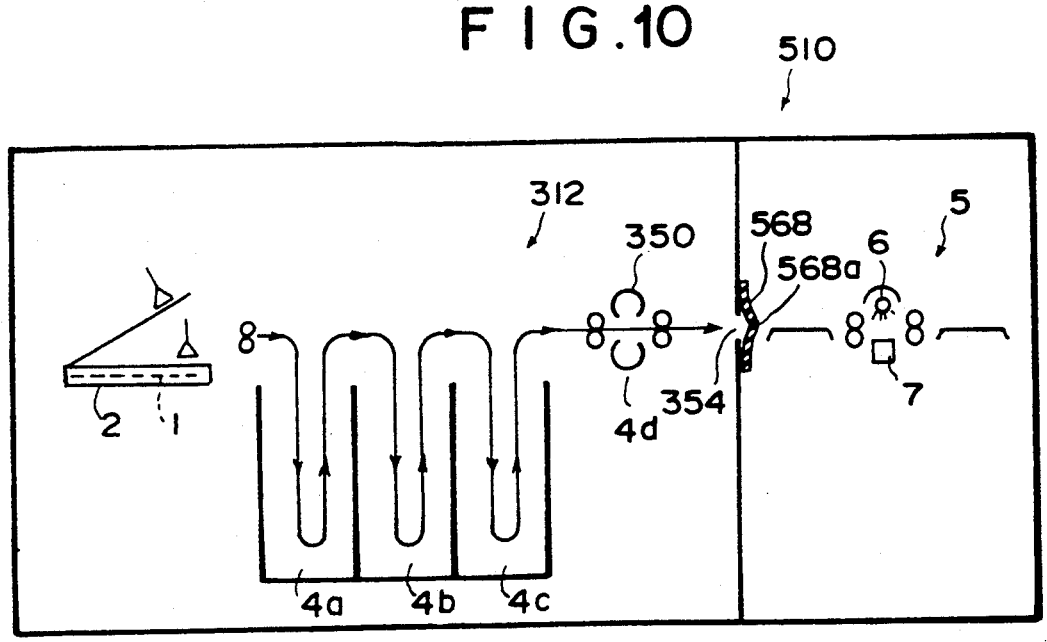

FIGS. 8, 9, and 10 are schematic side views showing different embodiments of the third radiation image read-out apparatus in accordance with the present invention.

In these embodiments, the drying zone 4d in an automatic developing machine 312 is not partitioned from the other zones of the automatic developing machine 312. The X-ray film 1 is dried by blowing air from a pair of air nozzles 350, which are located above and below the X-ray film 1, to the upper and lower surfaces of the X-ray film 1.

In the embodiment of FIG. 8, the corrosive gas inflow preventing mechanism in a radiation image read-out apparatus 310 is constituted of an opening and closing mechanism 352, which are located between the automatic developing machine 312 and the film digitizer 5.

Specifically, the partition between the automatic developing machine 312 and the film digitizer 5 is provided with an opening 354, through which the X-ray film 1 is to be passed. The opening and closing mechanism 352 moves a shutter 356 up and down and thereby opens and closes the opening 354. The shutter 356 is connected by a wire 358 and a lever 360 to a solenoid 62. Only when the X-ray film 1 is to be fed into the film digitizer 5, the solenoid 362 is operated to move the shutter 356 upwardly. When no X-ray film is passed through the opening 354, the opening 354 is closed by the shutter 356, and the corrosive gases are prevented from flowing into the film digitizer 5.

In the embodiment of FIG. 9, the corrosive gas inflow preventing mechanism in a radiation image read-out apparatus 410 is constituted of a pair of rollers 464, which are located between the automatic developing machine 312 and the film digitizer 5, and a covering means 466, which covers the rollers 464.

Specifically, the X-ray film 1 is conveyed between the pair of rollers 464, and the rollers 464 are covered by the covering means 466. In this manner, the opening 354 is covered such that the corrosive gases may be prevented from flowing into the film digitizer 5. The covering means 466 is constituted of flexible plate-like members, such as rubber plates or plastic material plates, and leaf springs which are embedded as core materials in the flexible plate-like members.

In the embodiment of FIG. 10, the corrosive gas inflow preventing mechanism in a radiation image read-out apparatus 510 is constituted of a flexible covering means 568, which is located between the automatic developing machine 312 and the film digitizer 5.

Specifically, the flexible covering means 568 is constituted of a rubber film having a slit 568a. When no X-ray film passes through the slit 568a, the opening 354 is closed by the flexible covering means 568 such that the corrosive gases may be prevented from flowing into the film digitizer 5.

Embodiments of the fourth radiation image read-out apparatus in accordance with the present invention will be described hereinbelow.

Figure 11:
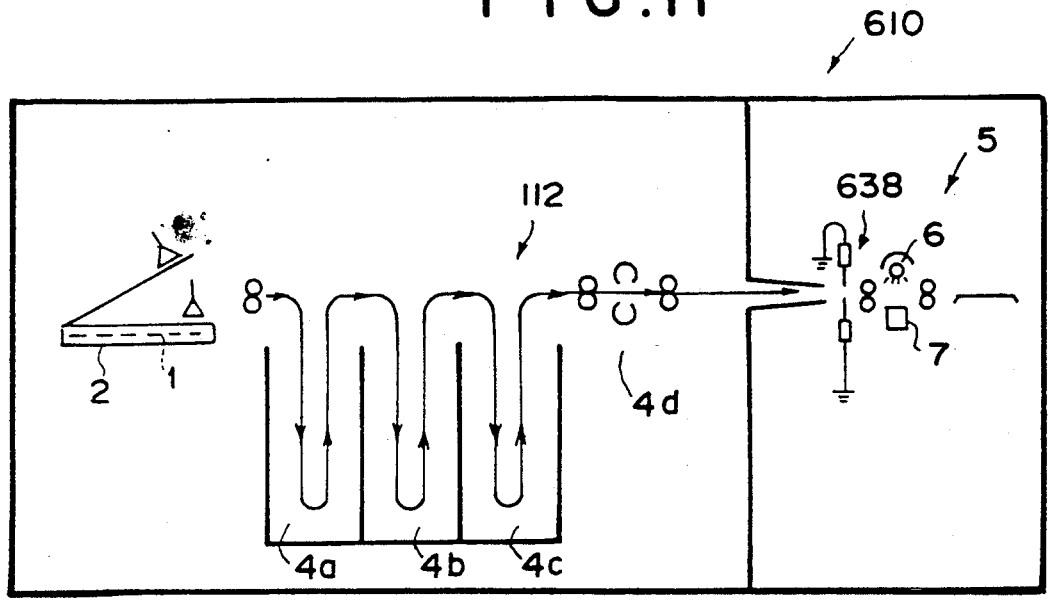
FIG. 11 is a schematic side view showing an embodiment of the fourth radiation image read-out apparatus in accordance with the present invention.

FIG. 11 is a schematic side view showing an embodiment of the fourth radiation image read-out apparatus in accordance with the present invention. In FIG. 11, similar elements are numbered with the same reference numerals with respect to FIG. 3.

With reference to FIG. 11, a radiation image read-out apparatus 610 is provided with the automatic developing machine 112 and the film digitizer 5, which is connected to the automatic developing machine 112.

In order for the image to be read out accurately by the film digitizer 5, the image read-out operation should be begun after the X-ray film 1 is set at a predetermined position in the film digitizer 5. However, if the X-ray film 1, which has been fed out of the automatic developing machine 112, has been charged electrostatically, the X-ray film 1 cannot be conveyed accurately. Therefore, there is the risk that the X-ray film 1 cannot be set at a predetermined position in the film digitizer 5.

In order to eliminate the aforesaid problems, as shown in FIG. 11, this embodiment is provided with a discharging brush 638, which is located between the automatic developing machine 112 and the film digitizer 5. The discharging brush 638 serves as a discharging mechanism for eliminating electrostatic charges having accumulated on the X-ray film 1, which has been fed out of the automatic developing machine 112.

Specifically, the discharging brush 638 comes into contact with the upper and lower surfaces of the X-ray film 1, which has been fed out of the automatic developing machine 112, and grounds the electrostatic charges which have accumulated on the X-ray film 1.

As described above, with the radiation image read-out apparatus 610, the X-ray image recorded on the X-ray film 1, which has been fed out of the automatic developing machine 112, is read out by the film digitizer 5 connected to the automatic developing machine 112. Therefore, manual operations for setting the X-ray film 1, on which the developing process has been carried out, in the film digitizer 5 need not be carried out. Also, there is no risk that, before the X-ray image is read out from the X-ray film 1, the film becomes stained with finger marks, dust, or the like. The radiation image read-out apparatus 610 is also provided with the discharging brush 638, which is located between the automatic developing machine 112 and the film digitizer 5. The discharging brush 638 eliminates electrostatic charges having accumulated on the X-ray film 1, which has been fed out of the automatic developing machine 112. Therefore, with the radiation image read-out apparatus 10 610, the X-ray film 1 can be conveyed accurately and can be accurately set at a predetermined position in the film digitizer 5 without being adversely affected by the electrostatic charging of the X-ray film 1. Also, discharging noise due to sparks caused to occur by electrostatic charges on the X-ray film 1 can be prevented from occurring. Accordingly, the X-ray image can be read out accurately from the X-ray film 1.

Figure 12:
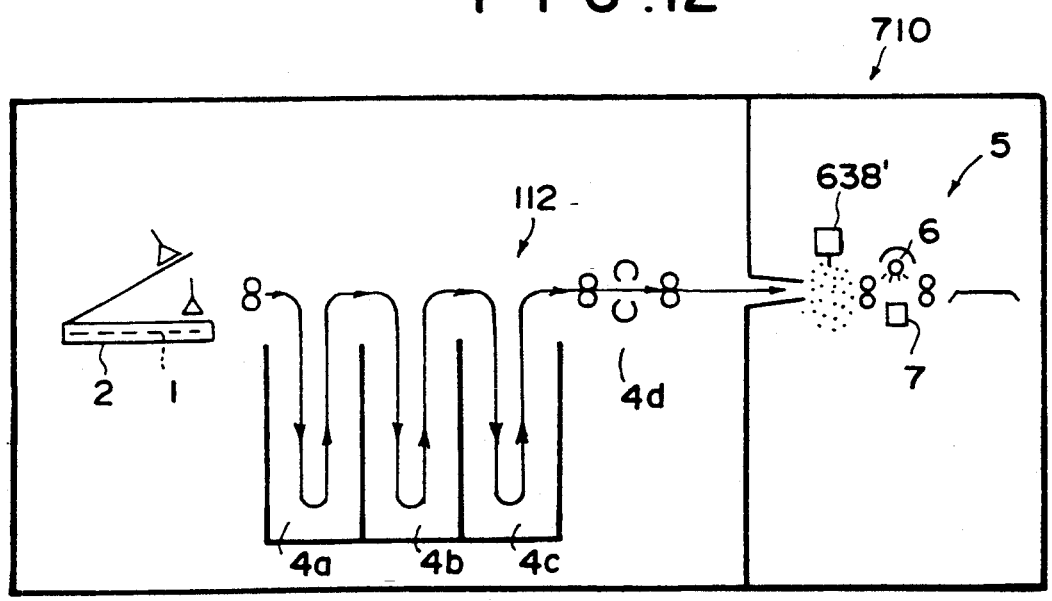
FIG. 12 is a schematic side view showing another embodiment of the fourth radiation image read-out apparatus in accordance with the present invention.

FIG. 12 is a schematic side view showing another embodiment of the fourth radiation image read-out apparatus in accordance with the present invention.

With reference to FIG. 12, a radiation image read-out apparatus 710 is provided with a discharging mechanism, which is different from the discharging mechanism employed in the embodiment of FIG. 11. Specifically, in this embodiment, instead of the discharging brush 638 shown in FIG. 11 being employed, the discharging mechanism is constituted of an ionic wind generating device 638', which generates an ionic wind. An ionic atmosphere is formed by the ionic wind, and the X-ray film 1 is passed through the ionic atmosphere. In this manner, electrostatic charges are eliminated from the X-ray film 1.

Embodiments of the sixth radiation image read-out apparatus in accordance with the present invention will be described hereinbelow.

Figure 13:
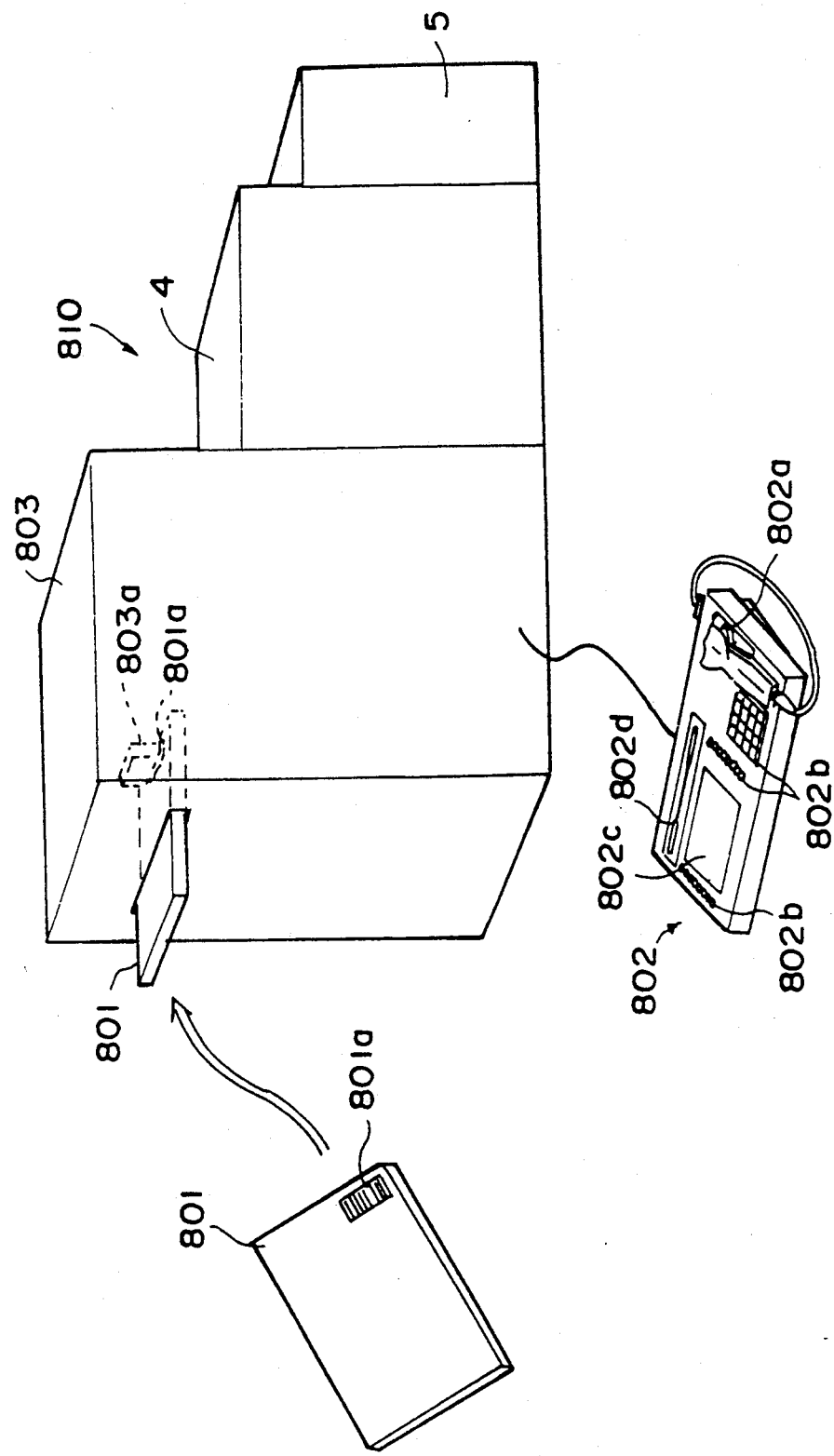
FIG. 13 is a perspective view showing an embodiment of the sixth radiation image read-out apparatus in accordance with the present invention, which is constituted as an X-ray image read-out apparatus.

FIG. 13 is a perspective view showing an embodiment of the sixth radiation image read-out apparatus in accordance with the present invention, which is constituted as an X-ray image read-out apparatus 810.

With reference to FIG. 13, a cassette 801 houses a sheet of X-ray film therein. In an X-ray image recording apparatus (not shown), the X-ray film housed in the cassette 801 is exposed to X-rays, which have passed through an object, and an X-ray image of the object is recorded on the X-ray film.

Also, before or after the X-ray image is recorded on the X-ray film, a bar code 801a provided on the cassette 801 is read by a bar code reader 802a, which is provided at an ID terminal 802 shown in FIG. 13. The bar code 801a is used to discriminate the cassette 801 from other cassettes. The ID terminal 802 is provided with a plurality of pushbuttons 802b, such as numeric keys. By depressing the pushbuttons 802b, the ID information giving specifics about the X-ray image recorded on the X-ray film is entered. The specifics about the X-ray image include, for example, the name of the object the image of which was recorded, the object number, the portion of an object the image of which was recorded, the mode in which the image was recorded, or the date on which the image was recorded. The ID information, which has been entered from the pushbuttons 802b, is displayed on a liquid crystal display device 802c. The displayed ID information is used in confirming that correct ID information has been entered. The ID terminal 802 is also provided with a magnetic card reader 802d. Therefore, the ID information can also be entered from a magnetic card, on which the ID information has been recorded at a different location.

After the X-ray image has been recorded on the X-ray film, the cassette 801 in which the X-ray film has been housed is fitted into a automatic cassette opener 803, which is located in the X-ray image read-out apparatus 810. The automatic cassette opener 803 constitutes an example of the take-out section of the sixth radiation image read-out apparatus in accordance with the present invention. The automatic cassette opener 803 is provided with a bar code reader 803a, which is located facing the bar code 801a of the cassette 801 having been fitted into the automatic cassette opener 803. The bar code 801a of the cassette 801, which has been fitted into the automatic cassette opener 803, is read by the bar code reader 803a. In this manner, it can be made clear which ID information entered from the ID terminal 802 corresponds to which cassette. It can also be made clear which ID information corresponds to which image signal representing an X-ray image recorded on the X-ray film housed in the cassette.

When the cassette 801 is fitted into the automatic cassette opener 803, the bar code 801a is read in the manner described above. Also, at the automatic cassette opener 803, the cassette 801 is opened, and the X-ray film is taken out of the cassette 801. The X-ray film, which has been taken out of the cassette 801, is fed into the automatic developing machine 4.

Instead of the automatic cassette opener 803 being provided, a film fitting device may be employed which is disclosed in, for example, Japanese Patent Application No. 1(1989)-34153. The disclosed film fitting device stores a plurality of sheets of X-ray film, on which no X-ray image has been recorded. With the disclosed film fitting device, after a sheet of X-ray film, on which an X-ray image has been recorded, is taken out of the cassette 801, a sheet of X-ray film, on which no X-ray image has been recorded, is automatically housed in the cassette 801.

The X-ray film, which has been fed into the automatic developing machine 4, is passed through the automatic developing machine 4 and subjected to a developing process comprising developing, fixing, washing, and drying steps. Thereafter, the X-ray film is fed into the film digitizer 5 shown in FIG. 4.

The image signal SD, which has been obtained from the A/D converter 9 shown in FIG. 4, and the ID information, which has been entered from the ID terminal 802 shown in FIG. 13, are fed in association with each other into an optical disk storage device (not shown). The image signal SD and the corresponding ID information are stored on an optical disk 136 shown in FIG. 4, which optical disk has been fitted into the optical disk storage device.

In the aforesaid embodiment, the bar code is provided on the cassette. Alternatively, a bar code may be provided directly on the X-ray film. In cases where the bar code is provided directly on the X-ray film, the cassette may be provided with a window, which transmits, for example, only infrared light, at a position corresponding to the position of the bar code of the X-ray film such that the bar code can be read from the X-ray film housed in the cassette. The bar code may then be read through the window by using infrared light.

In the embodiment of FIG. 13, the line sensor 7 is employed in the film digitizer 5 shown in FIG. 4. Therefore, an image signal is obtained which has been sampled at predetermined, fixed sampling intervals with respect to the direction X. Alternatively, in cases where sheets of X-ray film having various different sizes are used, instead of the line sensor 7 being employed, the light which has passed through the X-ray film 1 may be collected at a single location by using a light guide member, an optical fiber, or the like. The light, which has thus been collected, may be received by a photoelectric converter, such as a photomultiplier. Thereafter, the image signal may be sampled at sampling intervals, which are selected in accordance with the size of the X-ray film, with respect to the directions X and Y. In cases where the line sensor 7 is employed, a line sensor having elements arrayed at intervals corresponding to the smallest sampling intervals may be utilized. In such cases, after an image signal is obtained, interpolating operations, or the like, may be carried out on the image signal such that an image signal sampled at sampling intervals appropriate for the film size may be obtained ultimately.

Embodiments of the eighth radiation image read-out apparatus in accordance with the present invention will be described hereinbelow.

Figure 14:
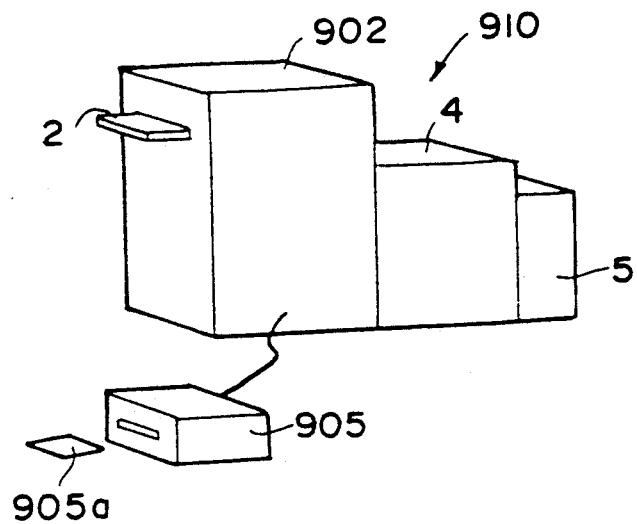
FIG. 14 is a perspective view showing an embodiment of the eighth radiation image read-out apparatus in accordance with the present invention, which is constituted as an X-ray image read-out apparatus.

FIG. 14 is a perspective view showing an embodiment of the eighth radiation image read-out apparatus in accordance with the present invention, which is constituted as an X-ray image read-out apparatus 910.

With reference to FIG. 14, a sheet of X-ray film is housed in a cassette 2. An X-ray image has been recorded on the X-ray film, which has been housed in the cassette 2, in an X-ray image recording apparatus (not shown). The cassette 2, in which the X-ray film carrying the X-ray image recorded thereon is housed, is set at an automatic cassette opener 902 in the X-ray image read-out apparatus 910. Thereafter, at the automatic cassette opener 902, the cassette 2 is opened, and the X-ray film is taken out of the cassette 2. The X ray film, which has been taken out of the cassette 2, is fed into the automatic developing machine 4.

Instead of the automatic cassette opener 902 being provided, a film fitting device may be employed which is disclosed in, for example, Japanese Patent Application No. 1(1989)-34153. The disclosed film fitting device stores a plurality of sheets of X-ray film, on which no X-ray image has been recorded. With the disclosed film fitting device, after a sheet of X-ray film, on which an X-ray image has been recorded, is taken out of the cassette 2, a sheet of X-ray film, on which no X-ray image has been recorded, is automatically housed in the cassette 2.

The X-ray film, which has been fed into the automatic developing machine 4, is passed through the automatic developing machine 4 and subjected to a developing process comprising developing, fixing, washing, and drying steps. Thereafter, the X-ray film is fed into the film digitizer 5 shown in FIG. 4. Also, the X-ray image read-out apparatus 910 is connected to a card image reader 905. Subsidiary information giving specifics about the X-ray image recorded on the X-ray film, which has been fed from the cassette 2 into the X-ray image read-out apparatus 910, is recorded by, e.g. the handwriting, on an ID card 905a. The specifics about the X-ray image include, for example, the name of the object the image of which was recorded, the object number, the portion of an object the image of which was recorded, the mode in which the image was recorded, or the date on which the image was recorded. The ID card 905a is inserted into the card image reader 905, and the subsidiary information recorded on the ID card 905a is read as an image information.

Also, in the X-ray image read-out apparatus 910, the information about the date, on which the process for obtaining the image signal from the X-ray film was carried out, (the date is ordinarily identical with the the date on which the image was recorded), and the information about the serial process number are automatically attached to the image signal. When the image signal is to be retrieved later, the information about the serial process number is utilized to designate the image signal. Alternatively, the information about the serial process number and the information about the date, on which the process for obtaining the image signal from the X-ray film was carried out, are utilized to designate the image signal.

The image signal SD, which has been obtained from the A/D converter 9 shown in FIG. 4, the information about the date, on which the process for obtaining the image signal from the X-ray film was carried out, the information about the serial process number, and the subsidiary information, which has been entered as image information from the card image reader 905 shown in FIG. 14, are fed in association with each other into an optical disk storage device (not shown). The image signal SD, the corresponding information about the date, on which the process for obtaining the image signal from the X-ray film was carried out, the corresponding information about the serial process number, and the corresponding subsidiary information are stored on an optical disk 136 shown in FIG. 4, which optical disk has been fitted into the optical disk storage device.

As described above, when the image signal is to be retrieved from the optical disk 136, the information about the serial process number is utilized to designate the image signal. Alternatively, the information about the serial process number and the information about the date, on which the process for obtaining the image signal from the X-ray film was carried out, are utilized to designate the image signal.

Figure 15:
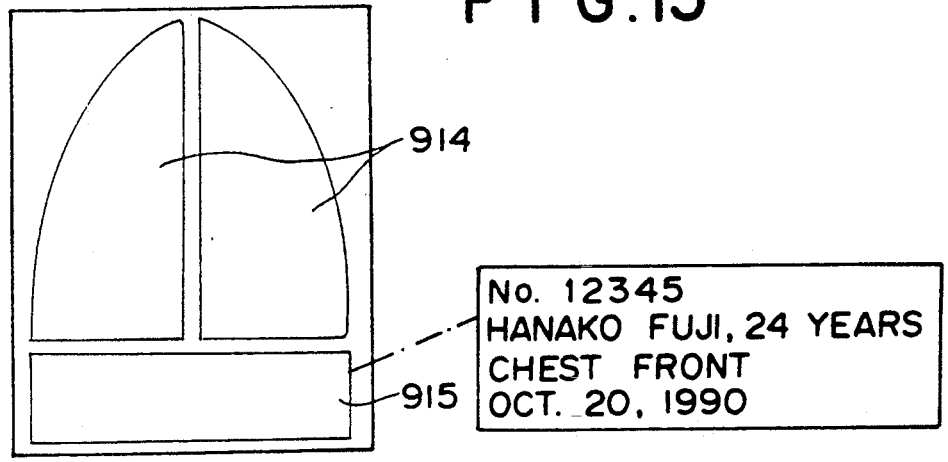
FIG. 15 is a schematic view showing a visible image reproduced from an image signal and subsidiary information.

FIG. 15 is a schematic view showing a visible image reproduced from an image signal and subsidiary information, which have been read from an optical disk. The visible image is displayed on a CRT display device (not shown) or recorded on a sheet of film by using a laser printer (not shown), or the like.

With reference to FIG. 15, the visible image is composed of an X-ray image 914, which has been reproduced from the image signal SD and is illustrated at the upper part of the visible image, and a pattern of the subsidiary information 915 read by the card image reader 905 shown in FIG. 14, which pattern is illustrated at the lower part of the visible image. Therefore, the X-ray image 914 can be viewed with reference to the pattern of the subsidiary information 915.

Figure 16:
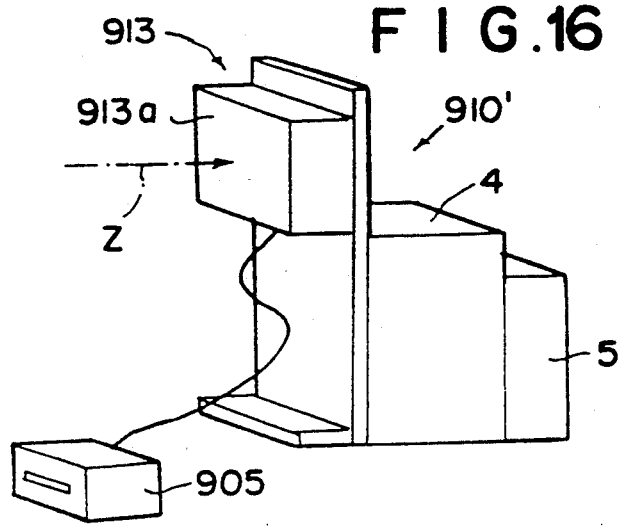
FIG. 16 is a perspective view showing another embodiment of the eighth radiation image read-out apparatus in accordance with the present invention, which is constituted as an X-ray image read out apparatus.

FIG. 16 is a perspective view showing another embodiment of the eighth radiation image read-out apparatus in accordance with the present invention, which as an X-ray image read-out apparatus 910'. In FIG. 16, similar elements are numbered with the same reference numerals with respect to FIG. 14.

With reference to FIG. 16, an image recording apparatus 913 (an X-ray source is not shown) is connected to the X-ray image read-out apparatus 910'. A plurality of sheets of X-ray film, on which no X-ray image has been recorded, are accommodated in the image recording apparatus 913. During operations for recording X-ray images, the sheets of X ray film are fed one after another to the rear side of an image recording surface 913a. After a sheet of X-ray film has been set on the rear side of the image recording surface 913a, X-rays are produced by the X-ray source and irradiated to an object. The X-rays, which have passed through the object, pass through the image recording surface 913a from the direction indicated by the arrow Z and impinge upon the X-ray film. As a result, an X-ray image of the object is recorded as a latent image on the X-ray film. The X-ray film, on which the X-ray image has been recorded, is fed directly from the image recording apparatus 913 into the automatic developing machine 4. In this manner, instead of the X-ray film being housed in a cassette 2 and fitted into the X-ray image read-out apparatus, the X-ray image read-out apparatus may be connected to the X-ray image recording apparatus, and the X-ray film may be automatically processed from the image recording step to the image read-out step.

In the embodiments of FIGS. 14 and 16, the line sensor 7 is employed in the film digitizer 5 shown in FIG. 4. Therefore, an image signal is obtained which has been sampled at predetermined, fixed sampling intervals with respect to the direction X. Alternatively, in cases where sheets of X-ray film having various different sizes are used, instead of the line sensor 7 being employed, the light which has passed through the X-ray film 1 may be collected at a single location by using a light guide member, an optical fiber, or the like. The light, which has thus been collected, may be received by a photoelectric converter, such as a photomultiplier. Thereafter, the image signal may be sampled at sampling intervals, which are selected in accordance with the size of the X-ray film, with respect to the directions X and Y. In cases where the line sensor 7 is employed, a line sensor having elements arrayed at intervals corresponding to the smallest sampling intervals may be utilized. In such cases, after the like, may be carried out on the image signal such that an image signal sampled at sampling intervals appropriate for the film size may be obtained ultimately.

In the embodiment of FIG. 14, the film digitizer 5 is connected to the automatic cassette opener 902 and the automatic developing machine 4. Also, in the embodiment of FIG. 16, the film digitizer 5 is connected to the the automatic developing machine 4. However, the eighth radiation image read-out apparatus in accordance with the present invention need not necessarily be connected to a automatic cassette opener or an automatic developing machine.

Embodiments of the ninth and tenth radiation image read-out apparatuses in accordance with the present invention will be described hereinbelow.

Figure 17:
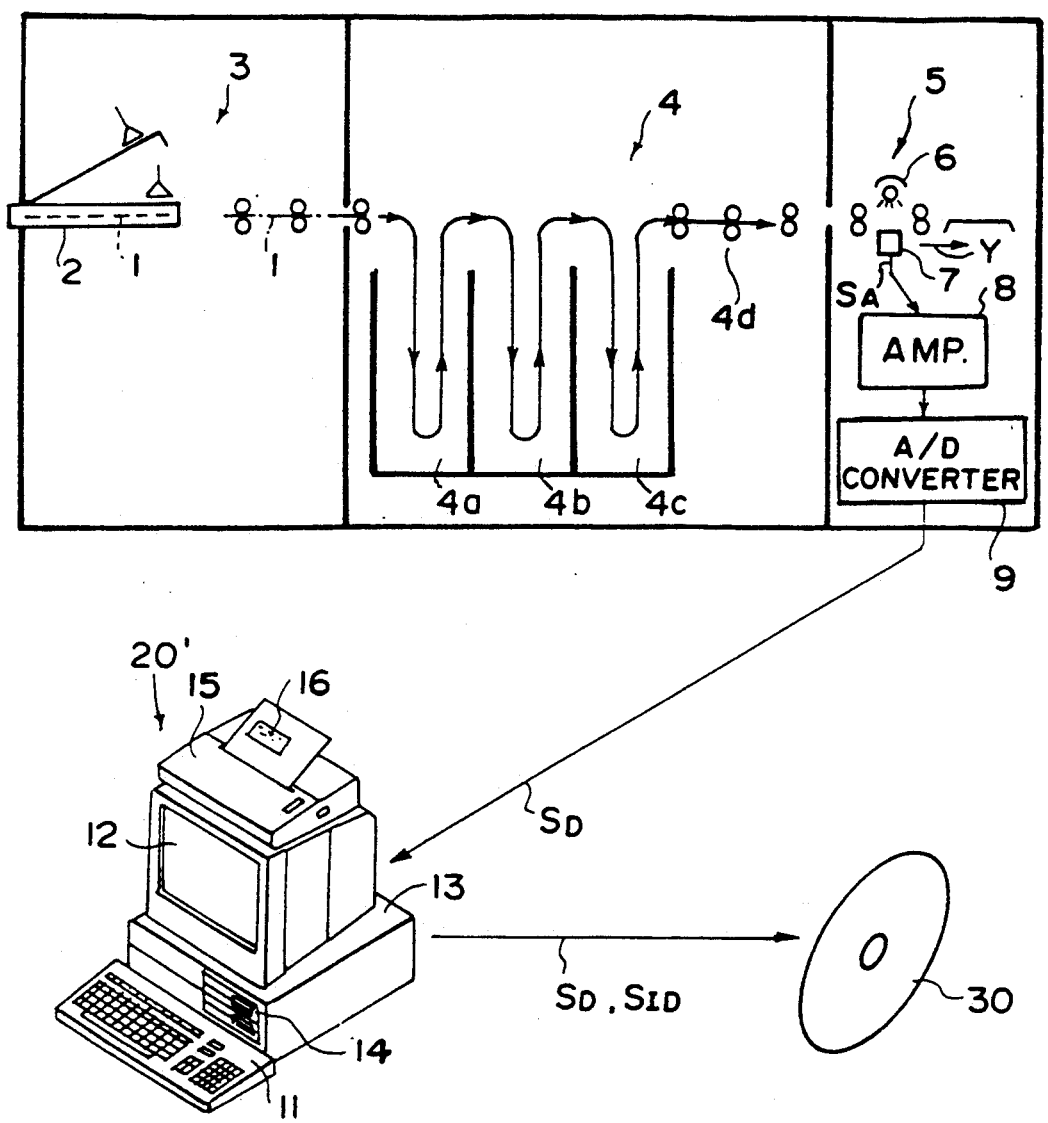
FIG. 17 is a schematic side view showing an embodiment of the ninth radiation image read-out apparatus in accordance with the present invention, which is constituted as an X-ray image read-out apparatus.

FIG. 17 is a schematic side view showing an embodiment of the ninth radiation image read-out apparatus in accordance with the present invention, which is constituted as an X-ray image read-out apparatus. In FIG. 17, similar elements are numbered with the same reference numerals with respect to FIG. 1.

This embodiment is different from the embodiment of FIG. 1 in that a computer system 20' is provided with a printer 15, which serves as an ID information output terminal.

Figure 18:
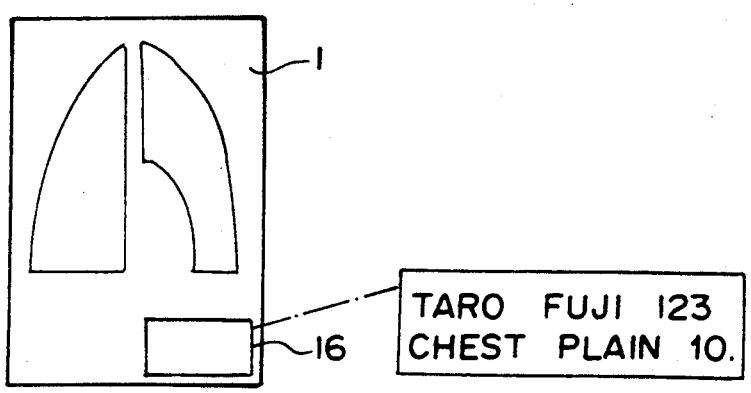
FIG. 18 is a schematic view showing an example of X-ray film to which a label has been adhered.

The printer 15 of the computer system 20' prints the ID information, which has been entered from the keyboard 11, on a label 16, which is set at the printer 15. As shown in FIG. 18, the label 16, on which the ID information has been printed, is adhered to a predetermined position on the X-ray film 1. The X-ray film 1, to which the label 16 has been adhered, is stored at a predetermined position in a filing compartment (not shown). In this manner, with this embodiment, the ID information is entered from the keyboard 11, and the ID signal SID is thereby generated. The image signal SD, which has been obtained from the film digitizer 5, and the corresponding ID signal SID are stored on the optical disk 30 such that a specific image signal may later be retrieved and used in displaying the image represented by the specific image. Also, the ID information, which has been entered from the keyboard 11, is printed on the label 16. By adhering the label 16, on which the ID information has been printed, to the X-ray film 1, it can be clarified that the X-ray film 1 and the ID information correspond to each other. In this manner, with this embodiment, the X-ray film 1, the corresponding image signal SD, and the corresponding ID information (or the corresponding ID signal SID) can be managed in association with each other.

In the embodiment of FIG. 17, the film digitizer 5 is connected to the automatic cassette opener 3 and the automatic developing machine 4. However, the ninth radiation image read-out apparatus in accordance with the present invention need not necessarily be connected to a automatic cassette opener or an automatic developing machine.

Figure 19:
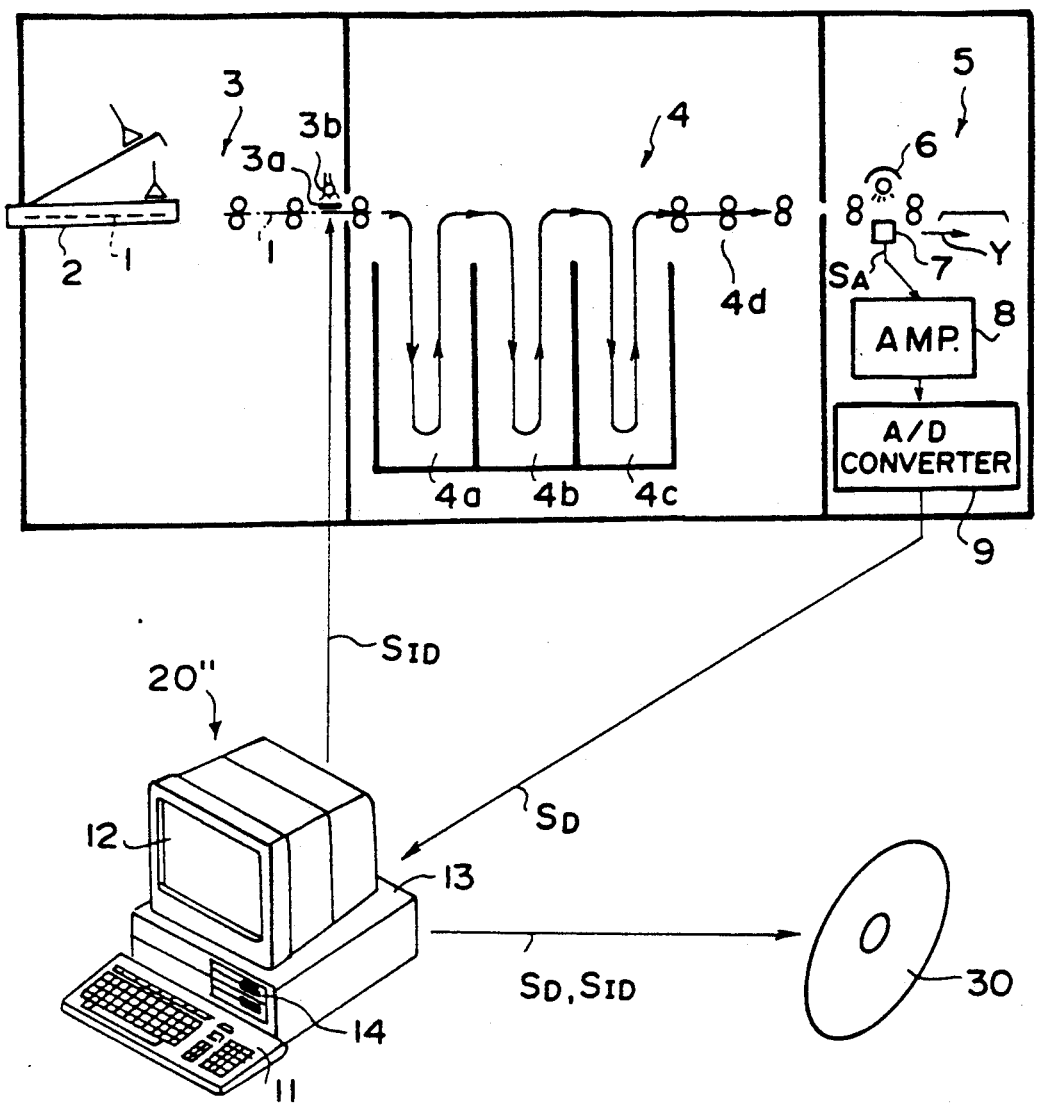
FIG. 19 is a schematic side view showing an embodiment of the tenth radiation image read-out apparatus in accordance with the present invention, which is constituted as an X-ray image read-out apparatus.

FIG. 19 is a schematic side view showing an embodiment of the tenth radiation image read-out apparatus in accordance with the present invention, which is constituted as an X-ray image read-out apparatus. In FIG. 19, similar elements are numbered with the same reference numerals with respect to FIG. 17.

The embodiment of FIG. 19 is different from the embodiment of FIG. 17 in that a computer system 20" has no printer and is provided with a liquid crystal panel 3a, which displays the ID information, and a lamp 3b for producing light, which is irradiated to the liquid crystal panel 3a.

The ID information is entered from the keyboard 11, and the ID signal SID is thereby generated. When the X-ray film 1 has been taken out of the cassette 2 and has reached the position, at which the liquid crystal panel 3a is located, an instruction is issued by the computer system 20" in order to display the ID information on the liquid crystal panel 3a. The liquid crystal panel 3a, on which the ID information is displayed, is exposed to the light produced by the lamp 3b. The light, which has passed through the liquid crystal panel 3a, is irradiated to the X-ray film 1. In this manner, as shown in FIG. 18, a pattern of the ID information is recorded at a predetermined position on the X-ray film 1. Thereafter, the X-ray film 1 is fed into the automatic developing machine 4.

In this embodiment, the pattern of the ID information is recorded on the X-ray film 1 before the developing process is carried out on the X-ray film 1. Therefore, as in the embodiment of FIG. 17, the X-ray film 1, the corresponding image signal SD, and the corresponding ID information (or the corresponding ID signal SID) can be managed in association with each other. Also, no operations are required to adhere the label 16 to the X-ray film 1.

Figure 20:
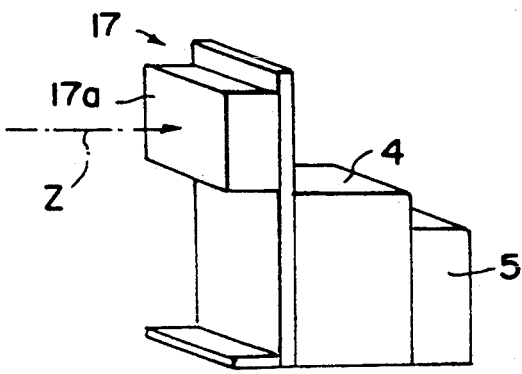
FIG. 20 is a perspective view showing an embodiment which may be applied to both the ninth and tenth radiation image read-out apparatuses in accordance with the present invention.

FIG. 20 is a perspective view showing an embodiment which may be applied to both the ninth and tenth radiation image read-out apparatuses in accordance with the present invention. In FIG. 20, similar elements are numbered with the same reference numerals with respect to FIGS. 17 and 19.

With reference to FIG. 20, an image recording apparatus 17 (an X-ray source is not shown) is connected to an X-ray image read-out apparatus. A plurality of sheets of X-ray film, on which no X-ray image has been recorded, are accommodated in the image recording apparatus 17. During operations for recording X-ray images, the sheets of X-ray film are fed one after another to the rear side of an image recording surface 17a. After a sheet of X-ray film has been set on the rear side of the image recording surface 17a, X-rays are produced by the X-ray source and irradiated to an object. The X-rays, which have passed through the object, pass through the image recording surface 17a from the direction indicated by the arrow Z and impinge upon the X-ray film. As a result, an X-ray image of the object is recorded as a latent image on the X-ray film. The X-ray film, on which the X-ray image has been recorded, is fed directly from the image recording apparatus 17 into the automatic developing machine 4. In this manner, instead of the X-ray film being housed in a cassette 2 and fitted into the X-ray image read-out apparatus, the X-ray image read-out apparatus may be connected to the X-ray image recording apparatus, and the X-ray film may be automatically processed from the image recording step to the image read-out step.

In this embodiment, a pattern of the ID information is recorded on the X-ray film before the developing process is carried out on the X-ray film. Alternatively, after the X-ray film is taken out of the radiation image read-out apparatus, a label, on which the ID information has been printed, is adhered to the X-ray film.

What is claimed is:

1. A radiation image read-out apparatus comprising:
   i) an automatic developing machine for carrying out a developing process on silver halide film, on which a radiation image has been recorded as a latent image, while said silver halide film is being passed through said automatic developing machine, and
   ii) a film digitizer, which is connected to said automatic developing machine such that it may directly receive said silver halide film having been fed out of said automatic developing machine, said film digitizer photoelectrically reading out said radiation image, which has been converted into a visible image during the developing process, from said silver halide film and thereby generating an image signal representing said radiation image.

2. An apparatus as defined in claim 1 wherein said film digitizer comprises a light source, which linearly irradiates light to said silver halide film having said visible image recorded thereon, and a line sensor located facing said light source with said silver halide film intervening therebetween, said line sensor detecting the light, which has been produced by said light source and has passed through said silver halide film.

3. An apparatus as defined in claim 1 wherein said silver halide film, on which said radiation image has been recorded as said latent image and which is to be fed into said automatic developing machine, is housed in a cassette, and said automatic developing machine is connected to an automatic cassette opener, which automatically opens said cassette, which then takes said silver halide film from said cassette, and which thereafter feeds said silver halide film into said automatic developing machine.

4. An apparatus as defined in claim 1 wherein said automatic developing machine is directly connected to a radiation image recording apparatus such that the silver halide film, on which the radiation image has been recorded as the latent image in said radiation image recording apparatus, may be directly fed from said radiation image recording apparatus into said automatic developing machine.

5. A radiation image read-out apparatus comprising:
   i) an automatic developing machine for carrying out a developing process on film, on which a radiation image has been recorded as a latent image, and
   ii) a film digitizer, which is connected to said automatic developing machine, said film digitizer photoelectrically reading out said radiation image from said film, which has been fed out of said automatic developing machine,
   wherein the improvement comprises the provision of a film orientation adjusting mechanism, which is located between said automatic developing machine and said film digitizer, said film orientation adjusting mechanism adjusting the orientation of said film, which has been fed out of said automatic developing machine, such that said film may be fed in a predetermined orientation into said film digitizer.

6. An apparatus as defined in claim 5 wherein said film orientation adjusting mechanism is provided with a guide plate for guiding said film, which has been fed out of said automatic developing machine, nip rollers for feeding said film along said guide plate into said film digitizer, and an adjusting lever for pushing said film on said guide plate against a stop plate and thereby adjusting the orientation of said film.

7. An apparatus as defined in claim 5 wherein said film orientation adjusting mechanism is provided with a plurality of oblique feed rollers for feeding said film, which has been fed out of said automatic developing machine, and simultaneously adjusting the orientation of said film.

8. An apparatus as defined in claim 5 wherein said film digitizer comprises a light source, which linearly irradiates light to said film having been fed out of said automatic developing machine, and a line sensor located facing said light source with said film intervening therebetween, said line sensor detecting the light, which has been produced by said light source and has passed through said film.

9. An apparatus as defined in claim 5 wherein said film, on which said radiation image has been recorded as said latent image and which is to be fed into said automatic developing machine, is housed in a cassette, and said automatic developing machine is provided with an automatic cassette opener, which automatically opens said cassette, which then takes said film from said cassette, and which thereafter feeds said film into said developing process.

10. A radiation image read-out apparatus comprising:
i) an automatic developing machine for carrying out a developing process on film, on which a radiation image has been recorded as a latent image, and
ii) a film digitizer, which is connected to said automatic developing machine, said film digitizer photoelectrically reading out said radiation image from said film, which has been fed out of said automatic developing machine,
wherein the improvement comprises the provision of a corrosive gas inflow preventing mechanism for preventing corrosive gases, which are generated in said automatic developing machine, from flowing from said automatic developing machine into said film digitizer.

11. An apparatus as defined in claim 10 wherein said corrosive gas inflow preventing mechanism comprises a pressure adjusting mechanism, which adjusts the pressure in said film digitizer such that it may be higher than the pressure in said automatic developing machine.

12. An apparatus as defined in claim 10 wherein said corrosive gas inflow preventing mechanism comprises an opening and closing mechanism, which is located between said automatic developing machine and said film digitizer.

13. An apparatus as defined in claim 10 wherein said corrosive gas inflow preventing mechanism comprises a pair of rollers, which are located between said automatic developing machine and said film digitizer, and a covering means, which covers the pair of said rollers.

14. An apparatus as defined in claim 10 wherein said corrosive gas inflow preventing mechanism comprises a flexible covering means, which is located between said automatic developing machine and said film digitizer.

15. An apparatus as defined in claim 10 wherein said film digitizer comprises a light source, which linearly irradiates light to said film having been fed out of said automatic developing machine, and a line sensor located facing said light source with said film intervening therebetween, said line sensor detecting the light, which has been produced by said light source and has passed through said film.

16. An apparatus as defined in claim 10 wherein said film, on which said radiation image has been recorded as said latent image and which is to be fed into said automatic developing machine, is housed in a cassette, and said automatic developing machine is provided with an automatic cassette opener, which automatically opens said cassette, which then takes said film from said cassette, and which thereafter feeds said film into said developing process.

17. A radiation image read-out apparatus comprising:
i) an automatic developing machine for carrying out a developing process on film, on which a radiation image has been recorded as a latent image, and
ii) a film digitizer, which is connected to said automatic developing machine, said film digitizer photoelectrically reading out said radiation image from said film, which has been fed out of said automatic developing machine,
wherein the improvement comprises the provision of a discharging mechanism, which is located between said automatic developing machine and said film digitizer, said discharging mechanism eliminating electrostatic charges having accumulated on said film, which has been fed out of said automatic developing machine.

18. An apparatus as defined in claim 17 wherein said discharging mechanism comprises a discharging brush, which comes into contact with the upper and lower surfaces of said film having been fed out of said automatic developing machine and grounds the electrostatic charges having accumulated on said film.

19. An apparatus as defined in claim 17 wherein said discharging mechanism comprises an ionic wind generating device, which generates an ionic wind and thereby forms an ionic atmosphere for eliminating the electrostatic charges having accumulated on said film fed out of said automatic developing machine.

20. An apparatus as defined in claim 17 wherein said film digitizer comprises a light source, which linearly irradiates light to said film having been fed out of said automatic developing machine, and a line sensor located facing said light source with said film intervening therebetween, said line sensor detecting the light, which has been produced by said light source and has passed through said film.

21. An apparatus as defined in claim 17 wherein said film, on which said radiation image has been recorded as said latent image and which is to be fed into said automatic developing machine, is housed in a cassette, and said automatic developing machine is provided with an automatic cassette opener, which automatically opens said cassette, which then takes said film from said cassette, and which thereafter feeds said film into said developing process.

22. A radiation image read-out apparatus comprising:
i) an automatic developing machine for carrying out a developing process on silver halide film, on which a radiation image has been recorded as a latent image, while said silver halide film is being passed through said automatic developing machine, ii) a film digitizer, which is connected to said automatic developing machine such, that, it may directly receive said silver halide film having been fed out of said automatic developing machine, said film digitizer photoelectrically reading out said radiation image, which has been converted into a visible image during the developing process, from said silver halide film and thereby generating an image signal representing said radiation image, and iii) an ID terminal, from which ID information giving specifics about said radiation image is entered.

23. An apparatus as defined in claim 22 wherein said film digitizer comprises a light source, which linearly irradiates light to said silver halide film having said visible image recorded thereon, and a line sensor located facing said light source with said silver halide film intervening therebetween, said line sensor detecting the light, which has been produced by said light source and has passed through said silver halide film.

24. An apparatus as defined in claim 22 wherein said silver halide film, on which said radiation image has been recorded as said latent image and which is to be fed into said automatic developing machine, is housed in a cassette, and said automatic developing machine is connected to an automatic cassette opener, which automatically opens said cassette, which then takes said silver halide film from said cassette, and which thereafter feeds said silver halide film into said automatic developing machine.

25. An apparatus as defined in claim 22 wherein said automatic developing machine is directly connected to a radiation image recording apparatus such that the silver halide film, on which the radiation image has been recorded as the latent image in said radiation image recording apparatus, may be directly fed from said radiation image recording apparatus into said automatic developing machine.

26. A radiation image read-out apparatus comprising:

i) a take-out section, into which a cassette provided with an identification code for discriminating said cassette from other cassettes is fitted, said take-out section being provided with a means for taking silver halide film, which has been housed in said cassette fitted into said take-out section and on which a radiation image has been recorded as a latent image, out of said cassette, ii) a developing section for carrying out a developing process on said silver halide film, which has been taken out of said cassette, while said silver halide film is being passed through said developing section, iii) a read-out section for photoelectrically reading out said radiation image, which has been recorded on said silver halide film having passed through said developing section, from said silver halide film and thereby generating an image signal representing said radiation image, and iv) an ID terminal, from which ID information giving specifics about said radiation image is entered, wherein said take-out section is provided with a first reading means for reading said identification code provided on said cassette, which has been fitted into said take-out section, and said ID terminal is provided with a second reading means for reading said identification code provided on said cassette from cassette.

27. An apparatus as defined in claim 26 wherein said take-out section is provided with an automatic cassette opener, which automatically opens said cassette, which then takes said silver halide film from said cassette, and which thereafter feeds said silver halide film into said automatic developing section.

28. An apparatus as defined in claim 26 wherein said identification code is a bar code, and said first reading means and said second reading means are bar code readers.

29. An apparatus as defined in claim 26 wherein said read-out section is provided with a film digitizer, which comprises a light source for linearly irradiating light to said silver halide film having said visible image recorded thereon, and a line sensor located facing said light source with said silver halide film intervening therebetween, said line sensor detecting the light, which has been produced by said light source and has passed through said silver halide film.

30. Radiation image read-out apparatus comprising:

i) a take-out section, into which a cassette is fitted, said cassette housing therein silver halide film, on which a radiation image has been recorded as a latent image and which is provided with an identification code for discriminating said silver halide film from other silver halide film, said take-out section being provided with a means for taking said silver halide film, which has been housed in said cassette fitted into said take-out section, out of said cassette, ii) a developing section for carrying out a developing process on said silver halide film, which has been taken out of said cassette, while said silver halide film is being passed through said developing section, iii) a read-out section for photoelectrically reading out said radiation image, which has been recorded on said silver halide film having passed through said developing section, from said silver halide film and thereby generating an image signal representing said radiation image, and iv) an ID terminal, from which the ID information giving specifics about said radiation image is entered, wherein each said cassette is provided with a window such that said identification code provided on said silver halide film, which has been housed in said cassette, can be read through said window from the exterior of said cassette, said take-out section is provided with a first reading means for reading said identification code provided on said silver halide film, and said ID terminal is provided with a second reading means for reading said identification code, which has been provided on said silver halide film, through the window of each said cassette.

31. An apparatus as defined in claim 30 wherein said take-out section is provided with an automatic cassette opener, which automatically opens said cassette, which then takes said silver halide film from said cassette, and which thereafter needs said silver halide film into said automatic developing section.

32. An apparatus as defined in claim 30 wherein said identification code is a bar code, and said first reading means and said second reading means are bar code readers.

33. An apparatus as defined in claim 30 wherein said read-out section is provided with a film digitizer, which comprises a light source for linearly irradiating light to said silver halide film having said visible image recorded thereon, and a line sensor located facing said light source with said silver halide film intervening therebetween, said line sensor detecting the light, which has been produced by said light source and has passed through said silver halide film.

34. A radiation image read-out apparatus comprising:
i) a film digitizer for photoelectrically reading out a radiation image from silver halide film, on which said radiation image has been recorded, and thereby generating a first image signal representing said radiation image,
ii) a card image reader for reading information from an ID card, on which said information has been recorded, said information being read as image information, and thereby generating a second image signal representing said information, and
iii) an automatic developing machine for carrying out a developing process on said silver halide film, on which said radiation image has been recorded as a latent image, while said silver halide film is being passed through said automatic developing machine, wherein said film digitizer is connected to said automatic developing machine such that asid film digitizer may directly receive said silver halide film having been fed out of said automatic developing machine.

35. An apparatus as defined in claim 34 wherein said film digitizer comprises a light source, which linearly irradiates light to said silver halide film having said visible image recorded thereon, and a line sensor located facing said light source with said silver halide film intervening therebetween, said line sensor detecting the light, which has been produced by said light source and has passed through said silver halide film.

36. An apparatus as defined in claim 34 wherein said silver halide film, on which said radiation image has been recorded as said latent image and which is to be fed into said automatic developing machine, is housed in a cassette, and said automatic developing machine is connected to an automatic cassette opener, which automatically opens said cassette, which then takes said silver halide film from said cassette, and which thereafter feeds said silver halide film into said automatic developing machine.

37. An apparatus as defined in claim 34 wherein said automatic developing machine is directly connected to a radiation image recording apparatus such that the silver halide film, on which the radiation image has been recorded as the latent image in said radiation image recording apparatus, may be directly fed from said radiation image recording apparatus into said automatic developing machine.

38. A radiation image read-out apparatus comprising:
i) a film digitizer for photoelectrically reading out a radiation image from film, on which said radiation image has been recorded and on which a developing process has been carried out, and thereby generating an image signal representing said radiation image,
ii) an ID information input terminal, from which ID information giving specifics about said radiation image is entered and which generated an ID signal representing said ID information, and
iii) an ID information output terminal for printing said ID information in accordance which said ID signal.

39. An apparatus as defined in claim 38 wherein said film digitizer comprises a light source, which linearly irradiates light to said film having said radiation image recorded thereon and having been subjected to said developing process, and a line sensor located facing said light source with said film intervening therebetween, said line sensor detecting the light, which has been produced by said light source and has passed through said film.

40. An apparatus as defined in claim 38 wherein said film digitizer is connected to an automatic developing machine for carrying out said developing process on said film, on which said radiation image has been recorded as a latent image, while said film is being passed through said automatic developing machine.

41. An apparatus as defined in claim 40 wherein said film, on which said radiation image has been recorded as said latent image and which is to be fed into said automatic developing machine, is housed in a cassette, and said automatic developing machine is connected to an automatic cassette opener, which automatically opens said cassette, which then takes said film from said cassette, and which thereafter feeds said film into said automatic developing machine.

42. An apparatus as defined in claim 40 wherein said automatic developing machine is directly connected to a radiation image recording apparatus such that the film, on which the radiation image has been recorded as the latent image in said radiation image recording apparatus, may be directly fed from said radiation image recording apparatus into said automatic developing machine.

43. A radiation image read-out apparatus comprising:
i) an automatic developing machine for carrying out a developing process on film, on which a radiation image has been recorded as a latent image, while said film is being passed through said automatic developing machine,
ii) a film digitizer for photoelectrically reading out said radiation image, which has been recorded on said film having passed through said developing machine, from said film and thereby generating an image signal representing said radiation image,
iii) an ID information input terminal, from which the ID information giving specifics about said radiation image is entered and which generates an ID signal representing said ID information, and
iv) an ID information recording means for recording a pattern of said ID information on said film in accordance with said ID signal before the developing process is carried out on said film.

44. An apparatus as defined in claim 43 wherein said film digitizer comprises a light source, which linearly irradiates light to said film having passed through said developing machine, and a line sensor located facing said light source with said film intervening therebetween, said line sensor detecting the light, which has been produced by said light source and has passed through said film.

45. An apparatus as defined in claim 43 wherein said film, on which said radiation image has been recorded as said latent image and which is to be fed into said automatic developing machine, is housed in a cassette, and said automatic developing machine is connected to an automatic cassette opener, which automatically opens said cassette, which then takes said film from said cassette, and which thereafter feeds said film into said automatic developing machine.

46. An apparatus as defined in claim 43 wherein said automatic developing machine is directly connected to a radiation image recording apparatus such that the film, on which the radiation image has been recorded as the latent image in said radiation image recording apparatus, may be directly fed from said radiation image recording apparatus into said automatic developing machine.

* * * * *